United States Patent
Arora et al.

(10) Patent No.: US 11,886,795 B2
(45) Date of Patent: *Jan. 30, 2024

(54) AESTHETIC MARKING OF TEXT IN DIGITAL TYPOGRAPHY

(71) Applicant: Adobe Inc., San Jose, CA (US)

(72) Inventors: Aman Arora, New Delhi (IN); Rohit Kumar Dubey, Chittorgarh (IN)

(73) Assignee: Adobe Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/653,735

(22) Filed: Mar. 7, 2022

(65) Prior Publication Data
US 2022/0188503 A1 Jun. 16, 2022

Related U.S. Application Data

(63) Continuation of application No. 16/571,065, filed on Sep. 14, 2019, now Pat. No. 11,295,065.

(51) Int. Cl.
*G06F 40/109* (2020.01)
*G06F 3/0482* (2013.01)
(Continued)

(52) U.S. Cl.
CPC .......... *G06F 40/109* (2020.01); *G06F 3/0482* (2013.01); *G06F 3/04847* (2013.01); *G06F 40/106* (2020.01); *G06F 40/166* (2020.01)

(58) Field of Classification Search
CPC .. G06F 3/0482; G06F 3/04847; G06F 40/106; G06F 40/109; G06F 40/166
See application file for complete search history.

(56) References Cited

U.S. PATENT DOCUMENTS 7,623,130 B1 * 11/2009 Burkey ................. G06F 40/109
345/469
8,633,930 B2 * 1/2014 Mansfield ............... G06T 11/60
345/472.3

(Continued)

OTHER PUBLICATIONS

CSS Text Decoration Module Level 3", retrieved from the Internet: https://www.w3.org/TR/css-text-decor-3/#text-decoration-skip 39 pages.

(Continued)

*Primary Examiner* — Chau T Nguyen
(74) *Attorney, Agent, or Firm* — Finch & Maloney PLLC

(57) ABSTRACT

A method for marking text in digital typography includes identifying one or more glyphs that intersect or overlap with a text marking bounding box, drawing a modified text marking to avoid intersecting with the one or more glyphs, and causing a display device to display the modified text marking with the text. The text marking is associated with a line of text including the glyphs or adjacent to a waxline of text including the glyphs. For each of the glyphs, the glyph corresponding to the glyph bounding box intersecting with the text marking is indicated. The modified text marking is drawn based on outlines of the glyphs, intersections between a text marking bounding box and the glyph outlines, and a user-specified glyph offset, text marking weight, and/or text marking offset to avoid intersecting with the glyphs. The shape of the modified text marking avoids intersecting with or overlapping the glyph.

20 Claims, 23 Drawing Sheets

(51) Int. Cl.
*G06F 3/04847* (2022.01)
*G06F 40/106* (2020.01)
*G06F 40/166* (2020.01)

(56) References Cited

U.S. PATENT DOCUMENTS

| | | | |
|---|---|---|---|
| 9,286,541 B1 | 3/2016 | Natarajan | |
| 10,127,673 B1 | 11/2018 | Ben Khalifa et al. | |
| 2005/0190187 A1 | 9/2005 | Salesin et al. | |
| 2008/0238927 A1* | 10/2008 | Mansfield | G06T 11/60 |
| | | | 345/467 |
| 2014/0195903 A1* | 7/2014 | Kaasila | G06F 40/109 |
| | | | 715/269 |
| 2017/0011017 A1 | 1/2017 | Jain | |
| 2018/0218523 A1* | 8/2018 | Dhanuka | G06F 40/109 |

OTHER PUBLICATIONS

T W Sederberg et al., "Curve Intersection Using Bézier Clipping", Computer Aided Design, Nov. 1990, pp. 538-549, vol. 22, No. 9.
Tadbeer Kaur and Rinkesh Mittal, "Hand-Drawn Annotation and Underline Detection and Removal in Scanned Documents Using Artificial Neural Network & Fuzzy C-Means Clustering", 2016, ISSN: 2394-658X, www.ejaet.com, pp. 9 (Year: 2016).
Zhen-Long Bai and Qiang Hou, "Underline Detection and Removal in a Document Image Using Multiple Strategies", IEEE, Proceedings of the 17th International Conference on Pattern Recognition, 2004, pp. 4 (Year: 2004).

\* cited by examiner

Underline bounding box

Non-breaking underline overlaps with glyphs

Breaking underline avoids overlaps

FIG. 19 spy

FIG. 20 one s two p three q four a

FIG. 21

AESTHETIC MARKING OF TEXT IN DIGITAL TYPOGRAPHY

CROSS-REFERENCE TO RELATED APPLICATION

This application is a continuation of U.S. patent application Ser. No. 16/571,065, filed Sep. 14, 2019, the entire disclosure of which is hereby incorporated herein by reference.

FIELD OF THE DISCLOSURE

This disclosure relates to the field of digital typography, and more particularly, to techniques for aesthetic marking of text in digital typography.

BACKGROUND

In typography, an underline or an underscore is a horizontal line below or through a portion of text. An overline or an overscore is a horizontal line over a portion of text. A strikethrough is a horizontal line through a portion of text. Collectively and individually, underlines, overlines, and strikethroughs are also referred to as text markings. FIG. 1 shows an example of underlined text 102. Single and double (double-underscore) underlining is often used to emphasize or stylize text. In some instances, an underline is used to denote misspelled or otherwise incorrect text. In printed documents, italics or small caps can be used for emphasis instead of underlining. In such instances, various forms of underlining are used to markup drafts prior to final typesetting to indicate that the text should be set in special type, such as italics. In some other instances, underlines are used as a diacritic to indicate that a letter has a different pronunciation from its non-underlined form. In certain web browsers, default settings typically distinguish hyperlinks by underlining them and changing their color, but both users and websites can change the settings to make some or all hyperlinks appear differently or even without distinction from normal text. Given the various purposes of underlining, there are non-trivial problems associated with displaying and printing underlined text in digital typography.

BRIEF DESCRIPTION OF THE DRAWINGS

The accompanying drawings are not intended to be drawn to scale.

FIG. 19 shows several examples of non-breaking and breaking underlines drawn such that the breaking underlines avoid intersecting or overlapping with any glyph, in accordance with certain embodiments of the present disclosure.

FIG. 20 shows an example of a breaking double underline drawn such that the double underline avoids intersecting or overlapping with any glyph, in accordance with certain embodiments of the present disclosure.

FIG. 21 shows an example of a continuous (non-breaking) underline drawn such that the underline avoids intersecting or overlapping with any glyph, in accordance with certain embodiments of the present disclosure.

DETAILED DESCRIPTION

Figures 20, 21:
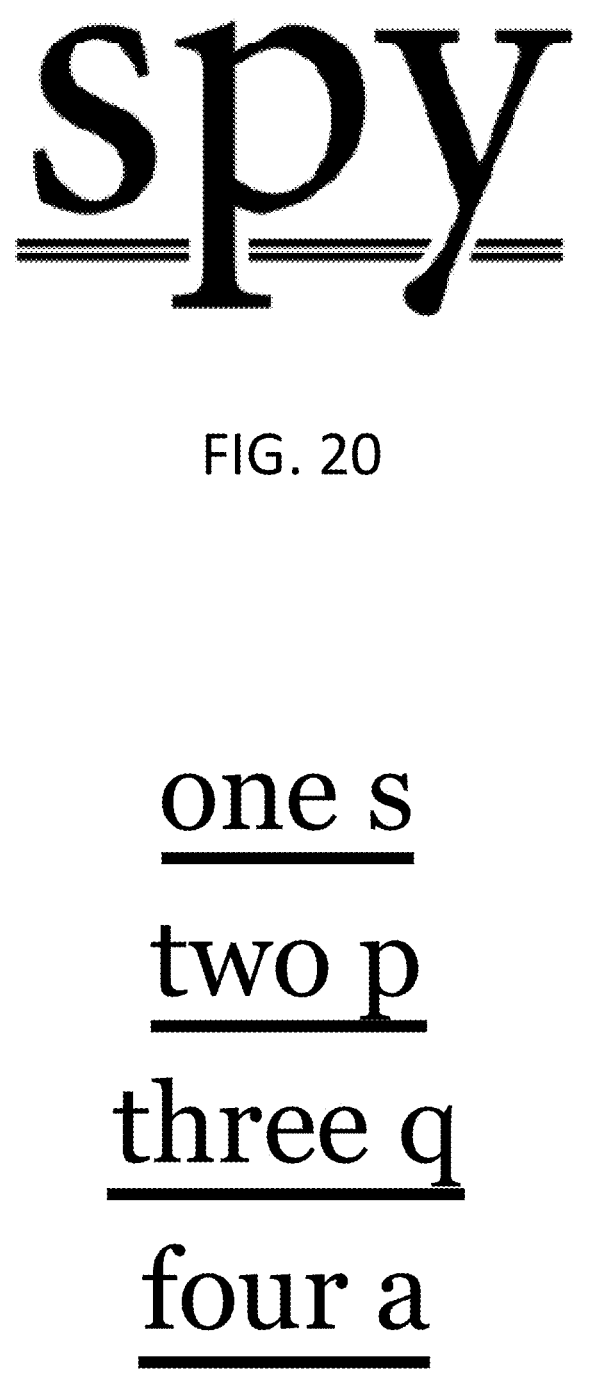

In accordance with certain embodiments of the present disclosure, techniques for marking text, including underlining text, in digital typography are disclosed. With some disclosed techniques, the text markings intersect or overlap with glyphs, or characters, in the text. However, the intersecting text markings can make the document more difficult to read and less aesthetically pleasing to look at. By contrast, some other disclosed techniques identify text markings that intersect with glyphs, or characters, in the text, and modify these text markings to avoid such intersections by applying either a glyph offset distance for separating a breaking text marking from individual glyphs, such as shown in FIGS. 19 and 20, or adjusting a text marking weight and a text marking offset for separating a continuous, non-breaking text marking from all glyphs, such as shown in FIG. 21. These techniques improve the visual and aesthetic appearance of the text with an impactful solution that visually corresponds with the design of the text.

As used in this disclosure, the term "text marking" refers to any marking that is used in conjunction with one or more glyphs, including underlines, overlines, and strike-throughs. For example, an underline is a horizontal line immediately below a portion of text that can be used to emphasize the text or provide markup for a draft of the text. As used in this disclosure, the term "text marking" includes a breaking line, a non-breaking line, and any horizontal line that is under, over, or through a glyph or text. For example, an underline can include a line that intersects with the descender of a glyph on the same line of text, or a line that intersects with the ascender of a glyph on a different line of text (i.e., the underline of one line intersects with a glyph on the line of text below the underlined text).

Figure 2:
FIG. 2 shows another example of underlined text where the underline intersects and cuts through the descenders of various glyphs.

Embodiments of the present disclosure address several problems relating to text marking text in digital typography. For instance, some disclosed techniques for marking text have a plain and simple appearance. However, the effect of marking or underlining on text using these techniques is not always visually pleasing, depending on the shape of the fonts and the overall design layout of the document (for example, varying the font spacing (kerning) and/or line spacing can affect the appearance of the document). In typography, a descender is a portion of a letter (glyph) that extends below the baseline of a font. If the underline intersects the descender, then the underline may cut through that portion of the glyph, which can produce an unpleasant visual effect. FIG. 2 shows an example of underlined text 202 where the underline intersects and cuts through the descenders of glyphs "g," "p," and "y." The overall combination of the text and underline in this example appears as if these typographic design components are being forcefully and inelegantly imposed upon each other. In this respect, the underline typeset does not conform to the shape of the glyph or the descender, causing the underline to overlap with or jump over the glyph. The underline thus appears alienated to the letter font and produces a clashing, non-synergistic effect.

The spacing between text markings and glyphs, including characters and subscript characters, as well as the spacing between glyphs and text markings of different (adjacent) lines of text has a great impact on the readability and visual appeal of the document. For example, the presence of an underline that overlaps a glyph may not meet the typeset design requirements for a document. Furthermore, such an overlap produces a cluttered and crowded appearance, which reduces the legibility, accessibility, and visual appeal of the document. This in turn can negatively impact the appeal and quality of the final product and the reputation of the document designer. The problem is further aggravated when using decorative or script fonts that have many glyphs that intersect with the underline.

Figure 3:
FIG. 3 shows yet another example of underlined text where glyphs with descenders are not underlined.

To avoid overlapping, some disclosed techniques break the underline into parts by eliminating portions of the underline under glyphs with descenders, such as shown in FIG. 3. In the underlined text 302 in FIG. 3, glyphs with descenders are not underlined while other glyphs are underlined normally. However, in some situations, such techniques are also not visually pleasing due to the abrupt and uneven breaks in the underline, again depending on the font and overall design layout of the document. Yet another disclosed solution includes manually erasing portions of the underline that intersect with the glyph. However, this manual technique can be tedious and time-consuming when there are many instances of glyphs overlapping with underlines or when the style of the font is complex. Thus, there remain non-trivial problems associated with marking text in digital typography.

To this end, some embodiments of the present disclosure, as described in further detail below, are considered aesthetic because the text marking corresponds with or avoids intersecting with the shape of the glyph to provide a more visually pleasing result than the above-disclosed techniques for marking text. For example, the text marking can be modified to break near the edges of the glyphs in a harmonious fashion so that the appearance of the text marking is similar to the design and style of the glyph, rather than simply overlapping the text marking with the glyph or creating harsh breaks in the text marking to avoid intersecting with the glyph. In another example, the thickness and position of the text marking can be modified so that a continuous, non-breaking text marking is drawn without intersecting or overlapping with any glyph in a line of text. These techniques allow a user to aesthetically mark text without letting the text marking intersect with any glyphs in the document by specifying either a glyph offset distance for separating the underline from individual glyphs, or a text marking weight and a text marking offset for separating the continuous text marking from all glyphs. The disclosed techniques can be used with any font and with the characters of any language or script, as well as with ascending glyphs, descending glyphs, super- and subscripts, ruby characters, and other linguistic features. Furthermore, the disclosed techniques can be used on individual characters and glyphs, words, paragraphs, documents, text selections, text frame selections, layer selections, page selections, or other groupings of characters and glyphs without converting the text into a fixed, non-editable format such as outlines or raster graphics.

As used in this disclosure, the term "glyph" refers to a symbol used in the visual representation of a single character (e.g., "f") or several adjacent characters (e.g., "fi"). Each glyph has a width and height that may include a fixed amount of white space on one or more sides of the symbol. The width and height of the glyph can be measured in pixels or other suitable units. In some alphabets, a character may have multiple glyphs (e.g., upper and lowercase versions of the same character, or where the characters are represented by several different typographical fonts). Used in combination, glyphs can be used to spell words or give meaning to what is written (e.g., accent marks, punctuation marks, and the like). Generally, text is formed from a sequence of glyphs.

System Architecture

Figure 4:
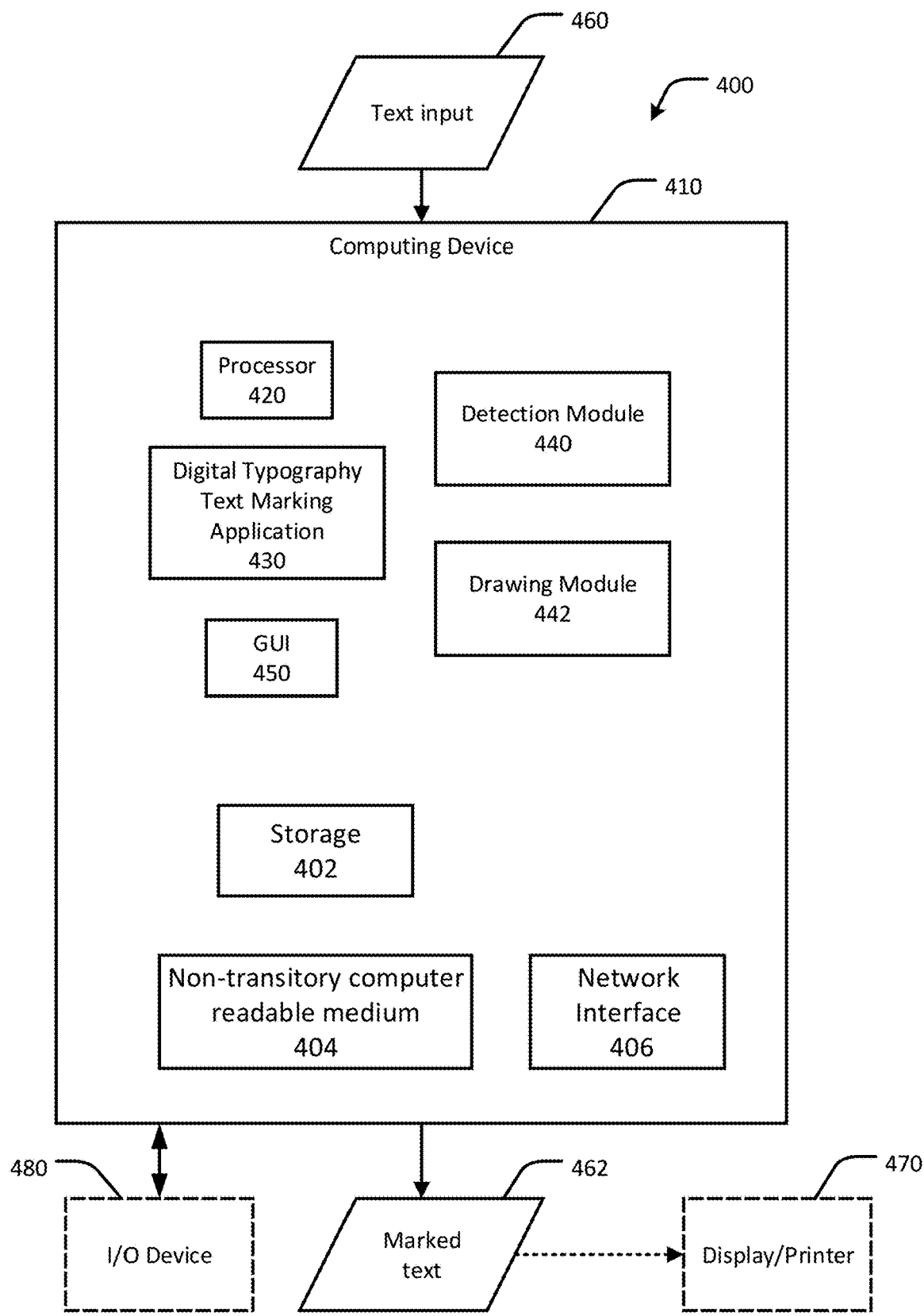
FIG. 4 shows an example system for underlining text in digital typography, in accordance with certain embodiments of the present disclosure.

FIG. 4 shows an example system 400 for marking text in digital typography, in accordance with an embodiment of the present disclosure. The system 400 includes a computing device 410 having a processor 420, a Digital Typography Text Marking Application 430, and a graphical user interface (GUI) 450. The GUI 450 includes a display and input device. The processor 420 of the computing device 410 is configured to execute Detection Module 440 and Drawing Module 442, which are described in further detail below. The computing device 410 is further configured to receive, as an input, a text input 460. The text input 460 includes one or more glyphs to be displayed by a display or printer device 470. The computing device 410 is further configured to produce, as an output, marked text 462 that is based at least in part on text input 460. The marked text 462 is based on coordinates of intersections between a text marking region and one or more glyphs in the text and/or outline paths of the glyphs, such as variously described in this disclosure.

As described in further detail below with respect to, for example, FIGS. 12, 14, 17 and 18, the Digital Typography Text Marking Application 430 is configured to perform one or more of the following functions: detecting and identifying glyph bounding boxes that intersect with a text marking bounding box associated with the text input 460, determining text marking offsets and weights; modifying text marking bounding boxes; drawing a modified text marking as one or more closed paths taking the intersections and glyph outlines into account, and producing the marked text 462 using the modified text marking.

Figure 1:
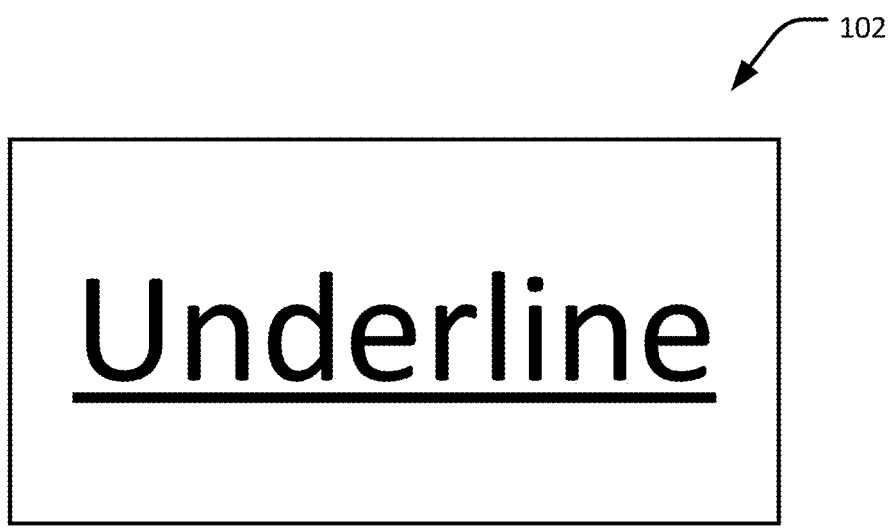
FIG. 1 shows an example of underlined text.

The computing device 410 can be used to perform any of the techniques as variously described in this disclosure. For example, the system 400 of FIG. 1, or any portions thereof, and the methodologies of FIGS. 12, 14, 17 and 18, or any portions thereof, may be implemented in the computing device 410. The computing device 410 may be any computer system, such as a workstation, desktop computer, server, laptop, handheld computer, tablet computer (e.g., the iPad® tablet computer), mobile computing or communication device (e.g., the iPhone® mobile communication device, the Android™ mobile communication device, and the like), VR device or VR component (e.g., headset, hand glove, camera, treadmill, etc.) or other form of computing or telecommunications device that is capable of communication and that has sufficient processor power and memory capacity to perform the operations described in this disclosure. A distributed computational system may be provided including a plurality of such computing devices.

The computing device 410 includes one or more storage devices 402 or non-transitory computer-readable media 404 having encoded thereon one or more computer-executable instructions or software for implementing techniques as variously described in this disclosure. The storage devices 402 may include a computer system memory or random access memory, such as a durable disk storage (which may include any suitable optical or magnetic durable storage device, e.g., RAM, ROM, Flash, USB drive, or other semiconductor-based storage medium), a hard-drive, CD-ROM, or other computer readable media, for storing data and computer-readable instructions or software that implement various embodiments as taught in this disclosure. The storage device 402 may include other types of memory as well, or combinations thereof. The storage device 402 may be provided on the computing device 410 or provided separately or remotely from the computing device 410. The non-transitory computer-readable media 404 may include, but are not limited to, one or more types of hardware memory, non-transitory tangible media (for example, one or more magnetic storage disks, one or more optical disks, one or more USB flash drives), and the like. The non-transitory computer-readable media 404 included in the computing device 410 may store computer-readable and computer-executable instructions or software for implementing various embodiments. The computer-readable media 404 may be provided on the computing device 410 or provided separately or remotely from the computing device 410.

The computing device 410 also includes at least one processor 420 for executing computer-readable and computer-executable instructions or software stored in the storage device 402 or non-transitory computer-readable media 404 and other programs for controlling system hardware. Virtualization may be employed in the computing device 410 so that infrastructure and resources in the computing device 410 may be shared dynamically. For example, a virtual machine may be provided to handle a process running on multiple processors so that the process appears to be using only one computing resource rather than multiple computing resources. Multiple virtual machines may also be used with one processor.

A user may interact with the computing device 410 through an output device 470, such as a screen, monitor, display, or printer, including an augmented reality display device, which may display one or more user interfaces provided in accordance with some embodiments. The output device 470 may also display other aspects, elements or information or data associated with some embodiments. The computing device 410 may include other I/O devices 480 for receiving input from a user, for example, a keyboard, a joystick, a game controller, a pointing device (e.g., a mouse, a user's finger interfacing directly with a touch-sensitive display device, etc.), or any suitable user interface. The computing device 410 may include other suitable conventional I/O peripherals. The computing device 410 includes or is operatively coupled to various suitable devices for performing one or more of the aspects as variously described in this disclosure.

The computing device 410 may run any operating system, such as any of the versions of Microsoft® Windows® operating systems, the different releases of the Unix® and Linux® operating systems, any version of the MacOS® for Macintosh computers, any embedded operating system, any real-time operating system, any open source operating system, any proprietary operating system, any operating systems for mobile computing devices, or any other operating system capable of running on the computing device 410 and performing the operations described in this disclosure. In an embodiment, the operating system may be run on one or more cloud machine instances.

In other embodiments, the functional components/modules may be implemented with hardware, such as gate level logic (e.g., FPGA) or a purpose-built semiconductor (e.g., ASIC). Still other embodiments may be implemented with a microcontroller having several input/output ports for receiving and outputting data, and several embedded routines for carrying out the functionality described in this disclosure. In a more general sense, any suitable combination of hardware, software, and firmware can be used, as will be apparent.

As will be appreciated in light of this disclosure, the various modules and components of the system, such as the Digital Typography Text Underlining Application 430, the Detection Module 440, the Drawing Module 442, the GUI 450, or any combination of these, is implemented in software, such as a set of instructions (e.g., HTML, XML, C, C++, object-oriented C, JavaScript®, Java®, BASIC, etc.) encoded on any computer readable medium or computer program product (e.g., hard drive, server, disc, or other suitable non-transitory memory or set of memories), that when executed by one or more processors, cause the various methodologies provided in this disclosure to be carried out. It will be appreciated that, in some embodiments, various functions and data transformations performed by the user computing system, as described in this disclosure, can be performed by similar processors or databases in different configurations and arrangements, and that the depicted embodiments are not intended to be limiting. Various components of this example embodiment, including the computing device 410, may be integrated into, for example, one or more desktop or laptop computers, workstations, tablets, smart phones, game consoles, set-top boxes, or other such computing devices. Other componentry and modules typical of a computing system, such as processors (e.g., central processing unit and co-processor, graphics processor, etc.), input devices (e.g., keyboard, mouse, touch pad, touch screen, etc.), and operating system, are not shown but will be readily apparent.

Example Methods

Figure 5:
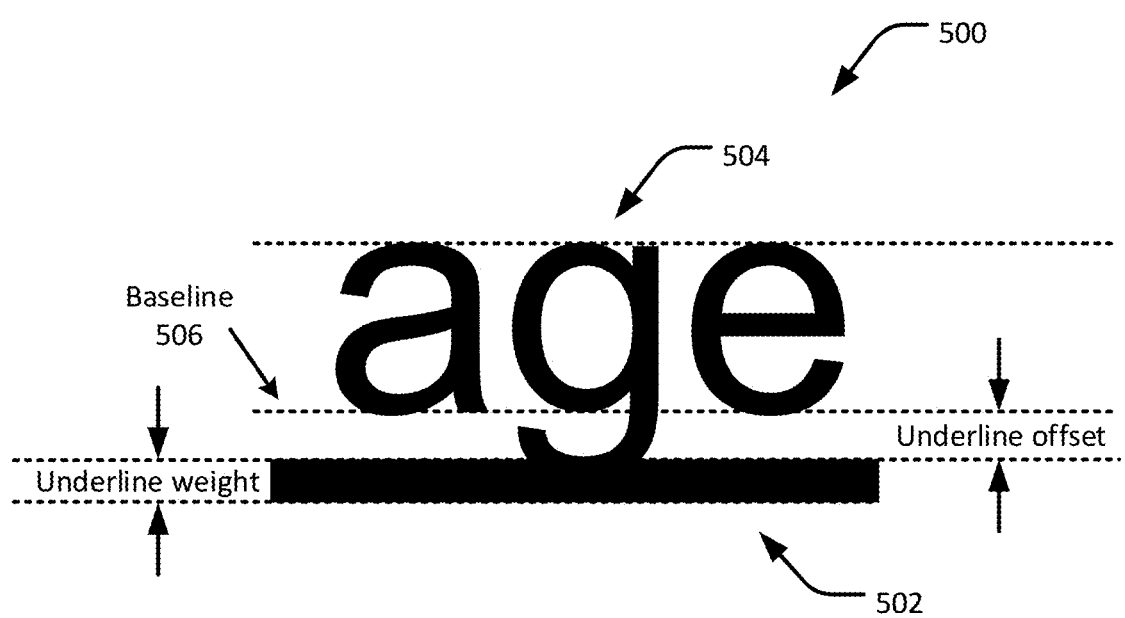
FIG. 5 shows another example of underlined text where the underline intersects and cuts through the descender of a glyph, in accordance with certain embodiments of the present disclosure.

FIG. 5 shows another example of underlined text 500 where the underline 502 intersects and cuts through the descender of a glyph 504. The underline 502 is defined by at least two parameters: an underline weight and an underline offset. The underline weight determines the thickness or height of the underline 502. The underline offset determines the vertical position of the underline 502 relative to the text 500. For example, the underline offset can be measured from a baseline 506 of the text font. A baseline is a line upon which most letters rest and below which descenders extend.

Figure 6:
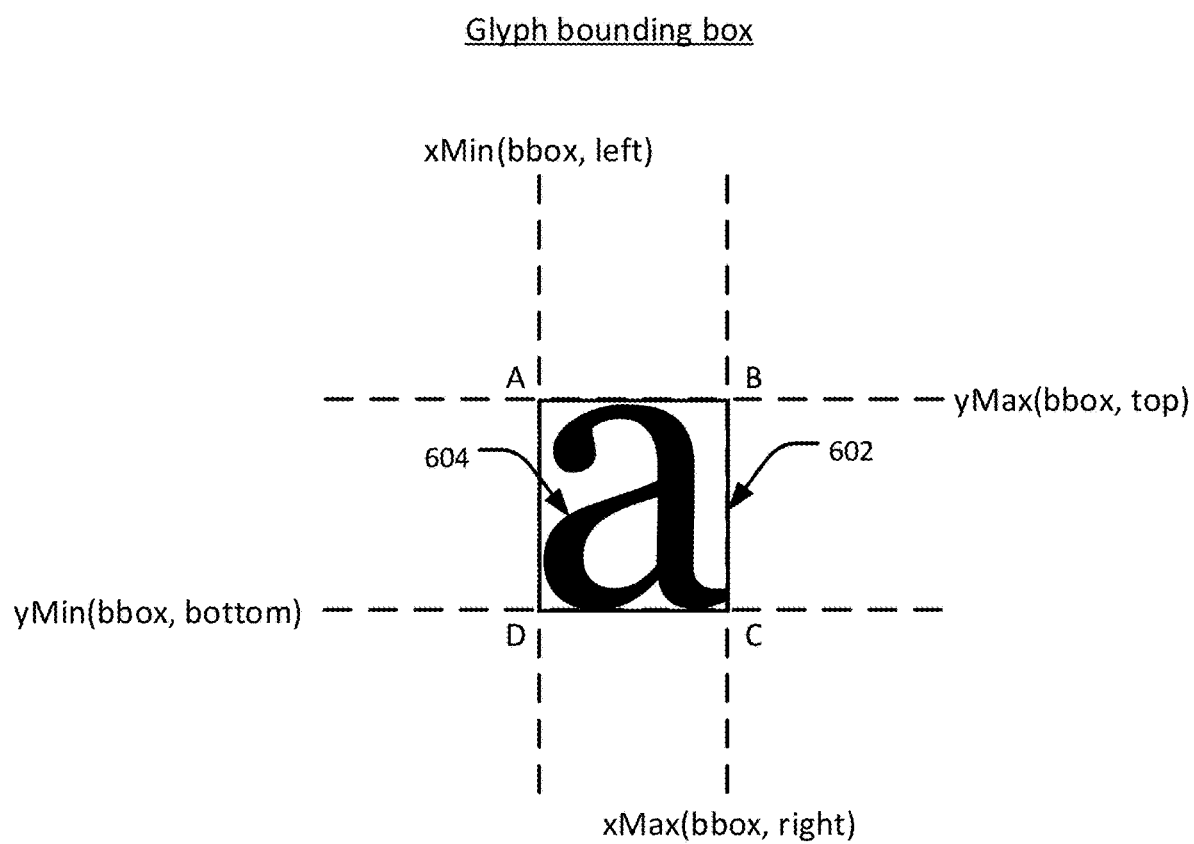
FIG. 6 shows an example of a glyph bounding box, in accordance with certain embodiments of the present disclosure.

FIG. 6 shows an example of a glyph bounding box 602, in accordance with an embodiment of the present disclosure. The glyph bounding box 602 is a box that encloses a glyph 604. In some cases, the glyph bounding box 600 is coincident with or adjacent to one or more edges of the glyph 604, although some offset, padding, or whitespace may separate the glyph bounding box 602 from the edges of the glyph 604. The glyph bounding box 602 has four corners A, B, C, and D, and is represented by four coordinate parameters xMin, yMin, yMax, and xMax which define the width and height of the bounding box. The glyph bounding box width is xMax−xMin, and the glyph bounding box height is yMax−yMin. In some embodiments, the glyph bounding box 602 is alternatively referred to as bbox.

Figure 7:
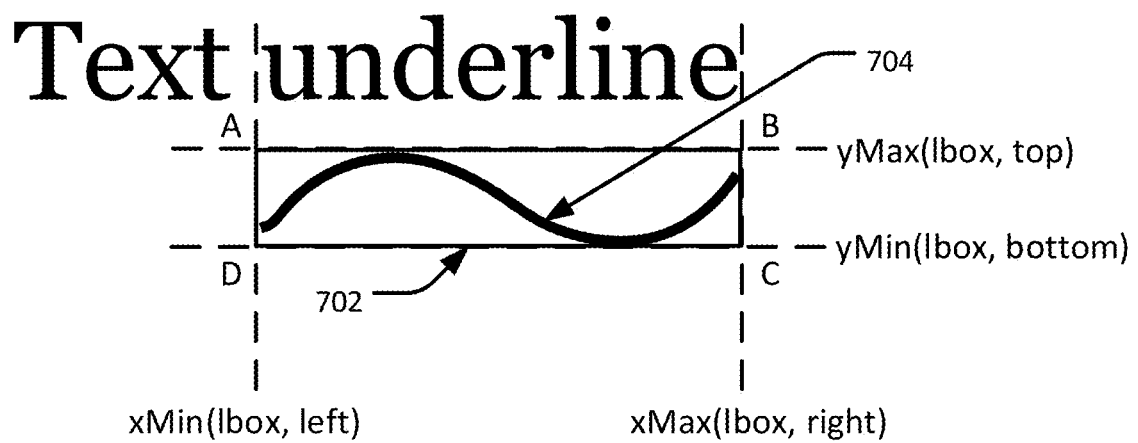
FIG. 7 shows an example of an underline bounding box, in accordance with certain embodiments of the present disclosure.

FIG. 7 shows an example of an underline bounding box 702, in accordance with an embodiment of the present disclosure. The underline bounding box 702 is a box that encloses an underline 704. In some cases, the underline bounding box 702 is coincident with or adjacent to one or more edges of the underline 704, although some offset, padding, or whitespace may separate the underline bounding box 702 from the edges of the underline 704. The underline bounding box 702 has four corners A, B, C, and D, and is represented by four coordinate parameters xMin, yMin, yMax, and xMax which define the width and height of the bounding box. The underline bounding box width is xMax−xMin, and the underline bounding box height is yMax−yMin. In some embodiments, the underline bounding box 702 is alternatively referred to as lbox.

Figure 8:
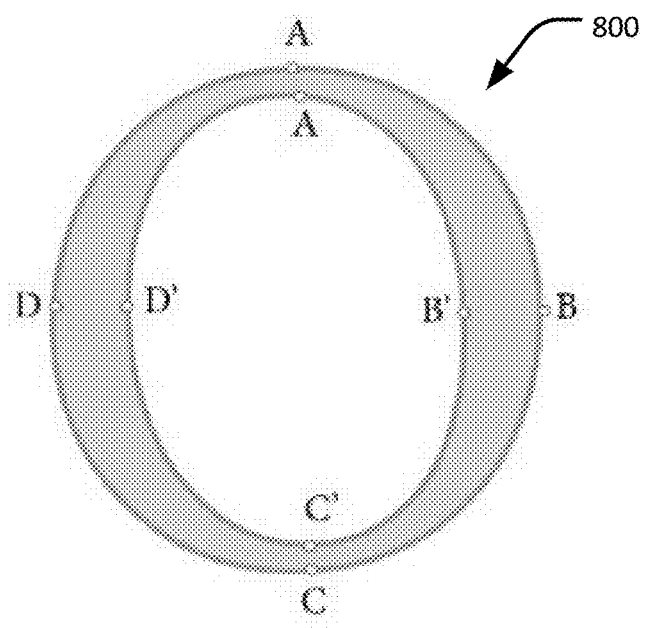
FIG. 8 shows an example of a glyph outline, in accordance with certain embodiments of the present disclosure.

FIG. 8 shows an example of a glyph outline 800, in accordance with an embodiment of the present disclosure. The glyph outline 800 includes one or more Bezier paths or composite Bezier curves, such as represented by the paths A-B-C-D-A and A'-B'-C'-D'-A', which define the shape of the glyph.

Figure 9:
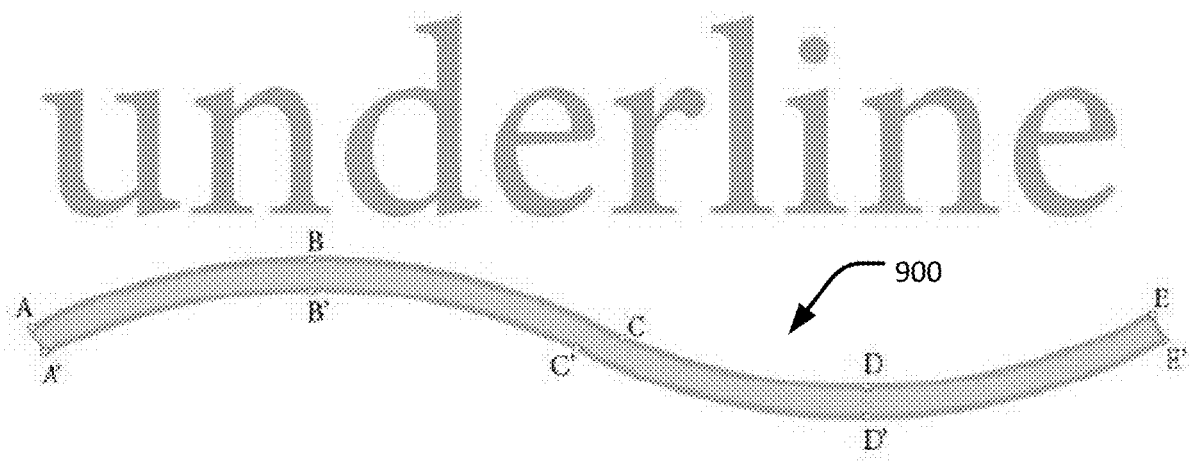
FIG. 9 shows an example of an underline outline, in accordance with certain embodiments of the present disclosure.

FIG. 9 shows an example of an underline outline 900, in accordance with an embodiment of the present disclosure. The underline outline 900 includes one or more Bezier paths or composite Bezier curves, such as represented by the path A-B-C-D-E-E'-D'-C'-B'-A'-A, which defines the shape of the underline.

Figure 10A:
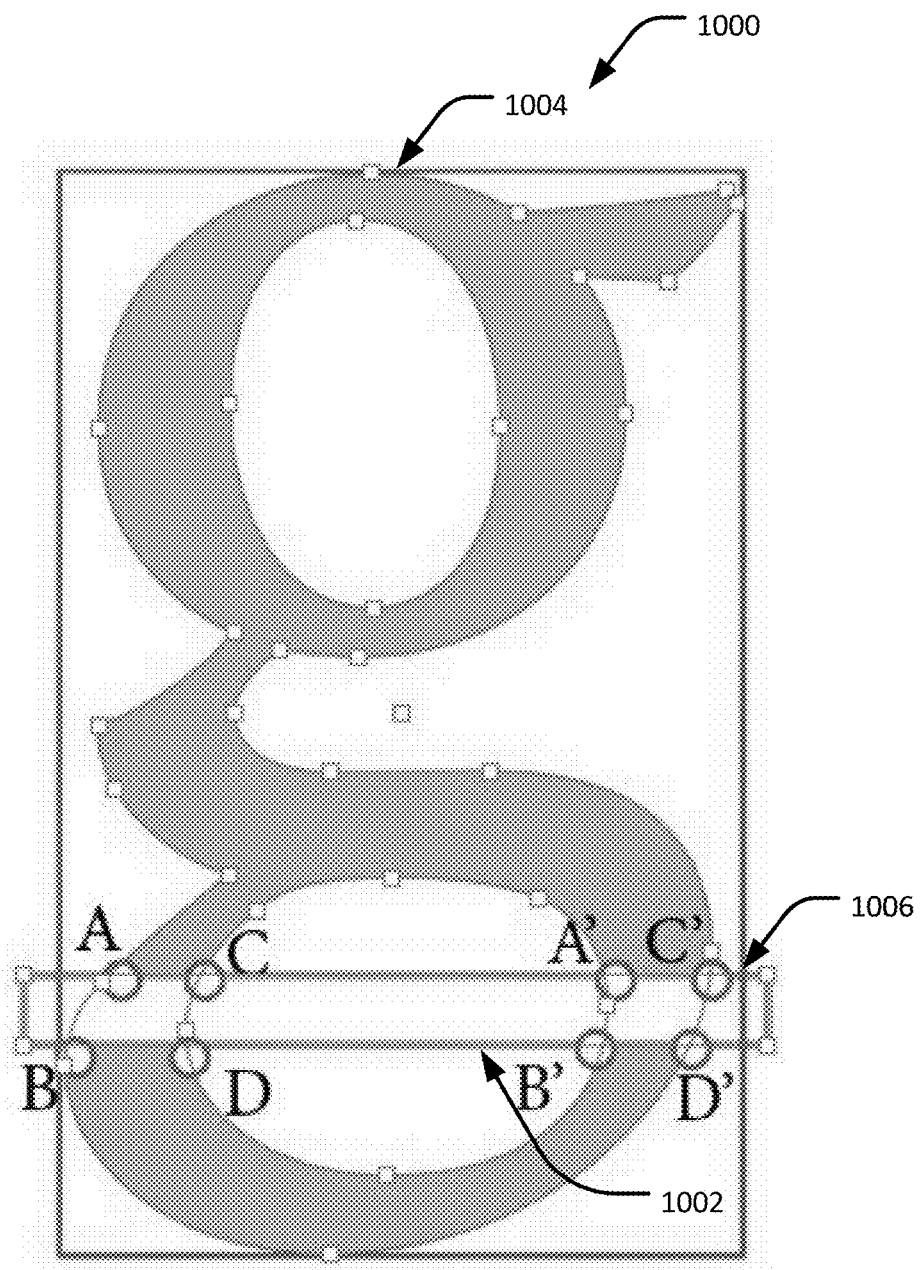
FIGS. 10A and 10B show an example of underlined text in accordance with certain embodiments of the present disclosure.
Figure 10B:
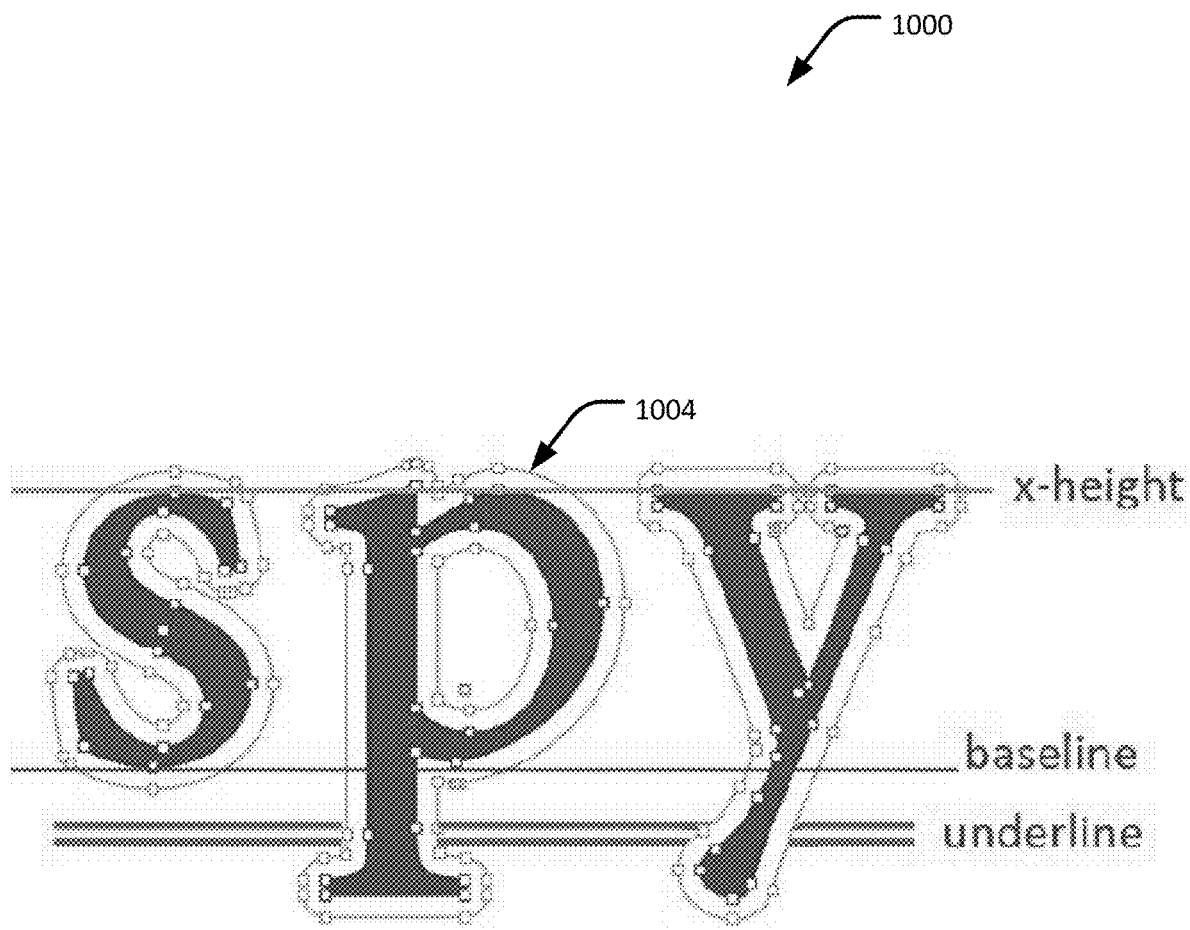
Figure 11:
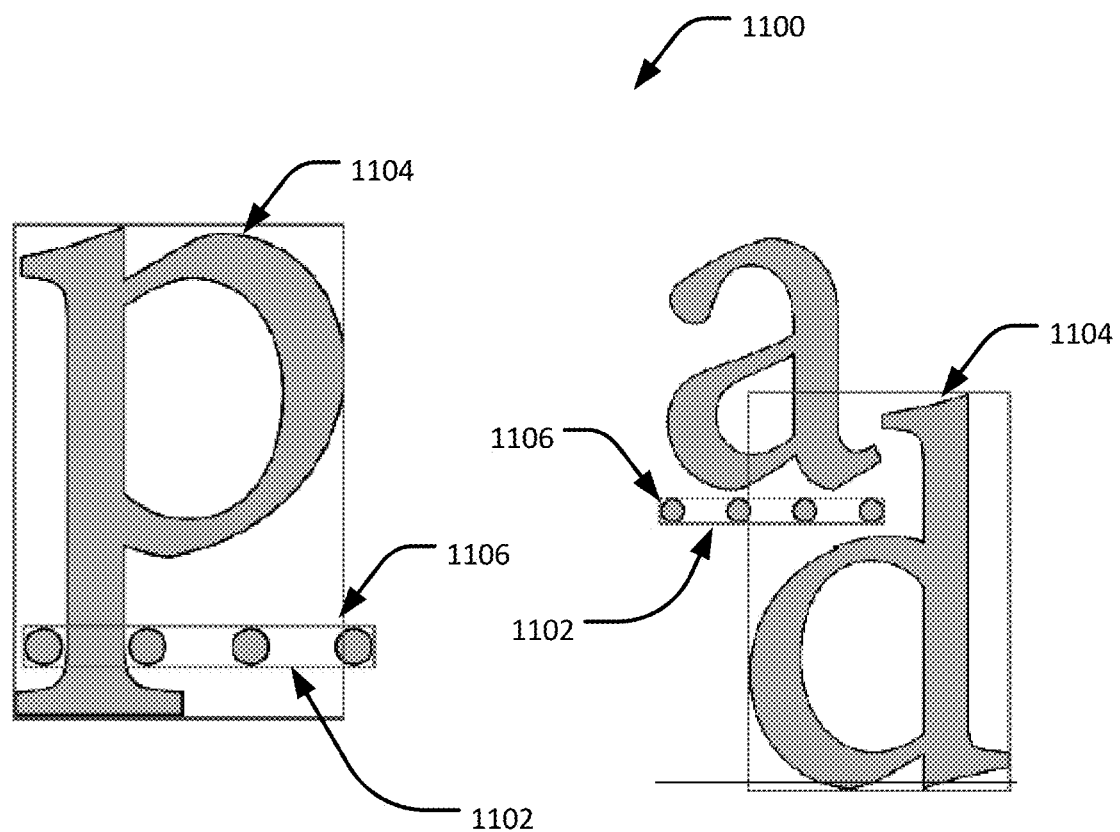
FIG. 11 shows an example of an underline bounding box that intersects with a glyph bounding box, in accordance with certain embodiments of the present disclosure.

FIGS. 10A, 10B and 11 are examples of underlined text 1000 and 1100 in accordance with an embodiment of the present disclosure. The underlined text 1000 includes an underline bounding box 1002 which intersects and overlaps with the descender of a glyph outline 1004 of the letter "g." The glyph outline 1004 includes one or more Bezier paths or composite Bezier curves that intersect with the underline bounding box 1004 at points A, B, C, D, A', B', C', and D'. In this example, the underline is considered erroneous or undesirable because it intersects with the glyph. Notably, the underline bounding box 1002 also intersects with the glyph bounding box 1006, which surrounds the glyph outline 1004. Therefore, in situations where the underline intersects with the glyph, the underline bounding box 1002 will also intersect with the glyph bounding box 1006. Conversely, in situations where the underline bounding box 1002 does not intersect with the glyph bounding box 1006, the underline will not intersect with the glyph, and thus no further analysis is needed to determine whether an underline intersects with that glyph. Note, however, as shown in FIG. 11, that there may be instances where the underline bounding box 1102 intersects with the glyph bounding box 1106 but not with the glyph 1104 itself, thus requiring further analysis to determine whether the underline intersects with the glyph.

Figure 12A:
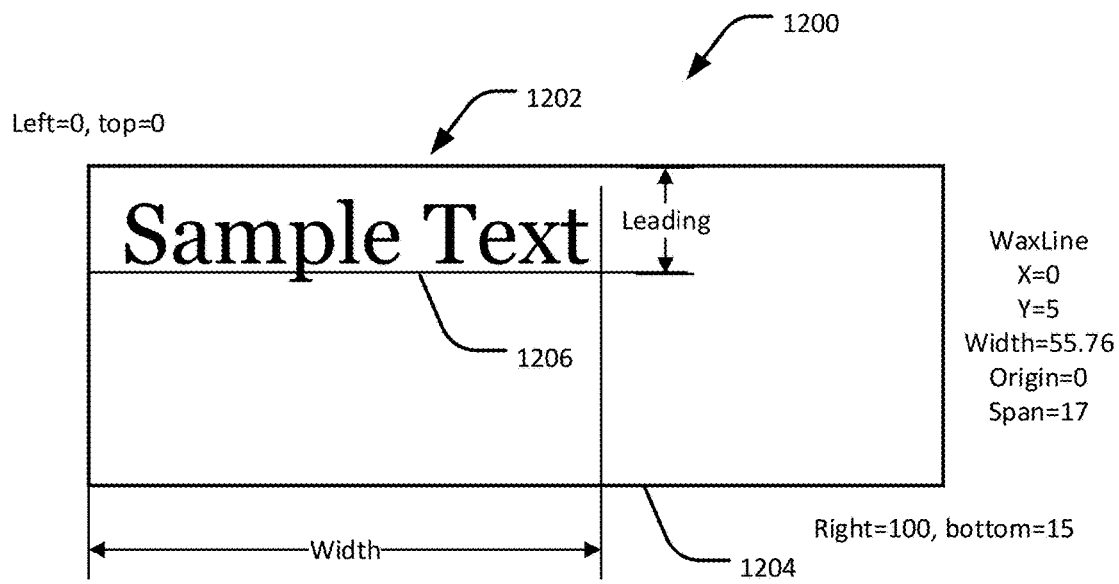
FIG. 12A shows an example of text on a waxline, in accordance with certain embodiments of the present disclosure.
Figure 12B:
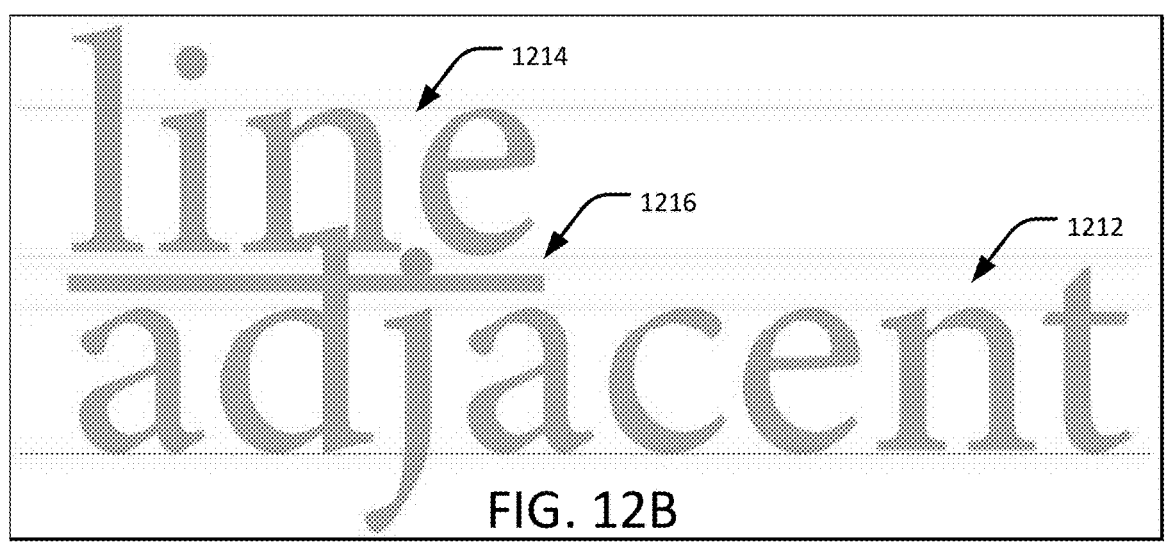
FIG. 12B shows another example of text on a waxline, in accordance with certain embodiments of the present disclosure.

FIG. 12A is an example of text 1200 on a waxline 1202, in accordance with an embodiment of the present disclosure. The waxline 1202 is created for each line of text in a text frame of a document. The waxline 1202 defines the coordinate position of the text 1200 in the document, the number of characters in the waxline, and line break data. For example, as shown in FIG. 12A, the text "Sample Text" forms a waxline 1202 within a text frame 1204. The text frame has an upper left corner at coordinates left=−100 and top=−15, and a lower right corner at coordinates right=100 and bottom=15. The waxline 1202 includes the text "Sample Text," a baseline 1206 of which has a leading and a width that define the position of the waxline 1202 relative to the frame 1204. Each waxline 1202 in the text frame 1204 can have a leading and width, which allows a user to customize the layout of text 1200. For example, FIG. 12B is another example of text 1210 on a waxline, in accordance with an embodiment of the present disclosure. FIG. 12B shows two waxlines 1212, 1214 that cause some of the glyphs in the lower waxline 1212 to overlap with the baseline 1216 of the upper waxline 1214.

In FIG. 12B, due to the positioning of the waxlines 1212 and 1214, an underline of the topmost line 1214 intersects with ascenders of glyphs "d" and "j" on the lower, adjacent line 1212. An ascender is the portion of a letter that extends above the mean line of a font (a line defining the top of the x-height of the font). This occurs, for example, when the glyph bounding boxes on the lower line intersect with the underline bounding box applied to glyphs in the adjacent upper waxline of the text frame.

Figure 13:
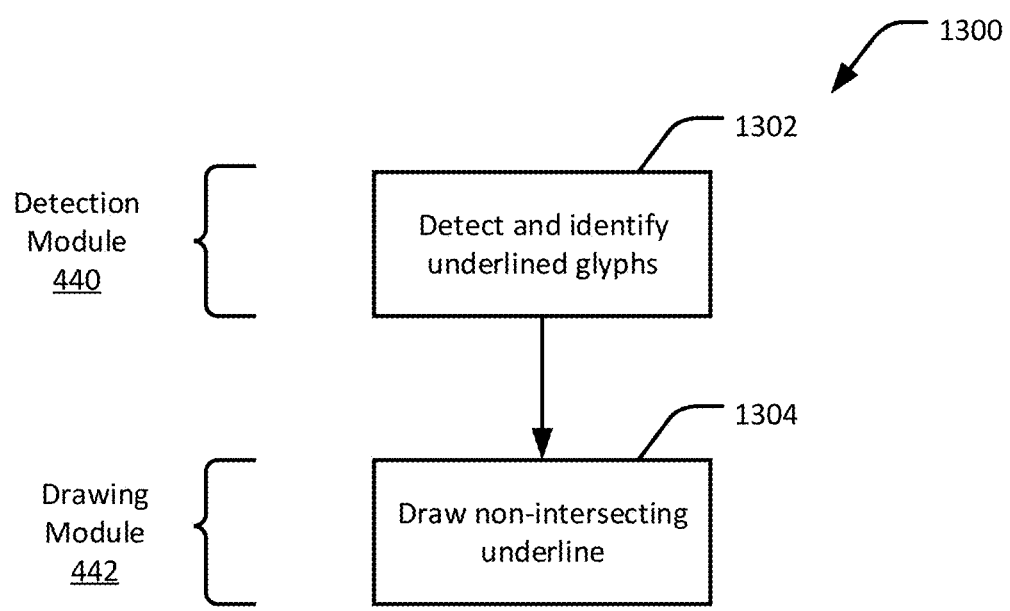
FIG. 13 is a flow diagram of an example method for underlining of text in digital typography, in accordance with certain embodiments of the present disclosure.

FIG. 13 is a flow diagram of an example method 1300 for underlining of text in digital typography, in accordance with an embodiment of the present disclosure. The method 1300 can be implemented by the detection module 440, the drawing module 442, or both. The method 1300 includes detecting 1302 glyph outlines that intersect with an underline and drawing 1304 an underline that avoids intersecting with any glyph outline (i.e., the underline does not intersect or overlap with the glyph). As used in this disclosure, the term "drawing," in addition to its plain and ordinary meaning, includes generating data representing text and/or graphics that is stored in a memory of a computer and/or used to display the text and/or graphics on a display device of a computer. For example, drawing an underline (or a modified underline) includes generating data representing a position, length, and width of a horizontal line to be displayed with associated text. The data representing the underline can subsequently be used to display the underline on a display device at the corresponding position and at the corresponding length and width. The underline can include any shape including a horizontal line, a non-horizontal line, or a curve that approximates a line, such as a decorative or stylistic design.

With respect to detecting 1302 glyph outlines that intersect with an underline, there are two cases where a glyph outline can intersect with an underline: 1) glyphs having descenders that intersect with an underline applied to the glyph, such as shown in FIGS. 5 and 10, and 2) glyphs having descenders or ascenders that intersect with an underline applied to characters in an adjacent line of text, such as shown in FIG. 12B. Both cases are detectable using the one or more of the following algorithms.

Figure 14A:
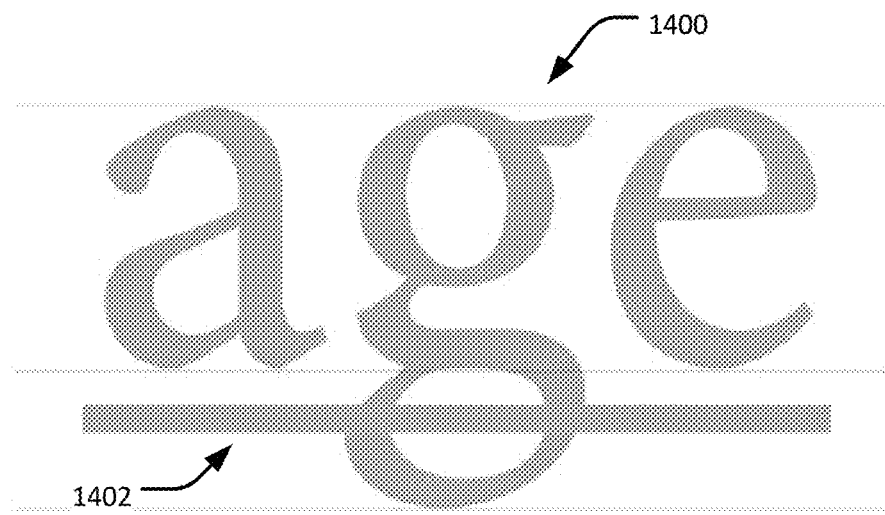
FIGS. 14A and 14B show an example of a glyph having a descender that intersects with an underline applied to the glyph, in accordance with certain embodiments of the present disclosure.
Figure 14B:
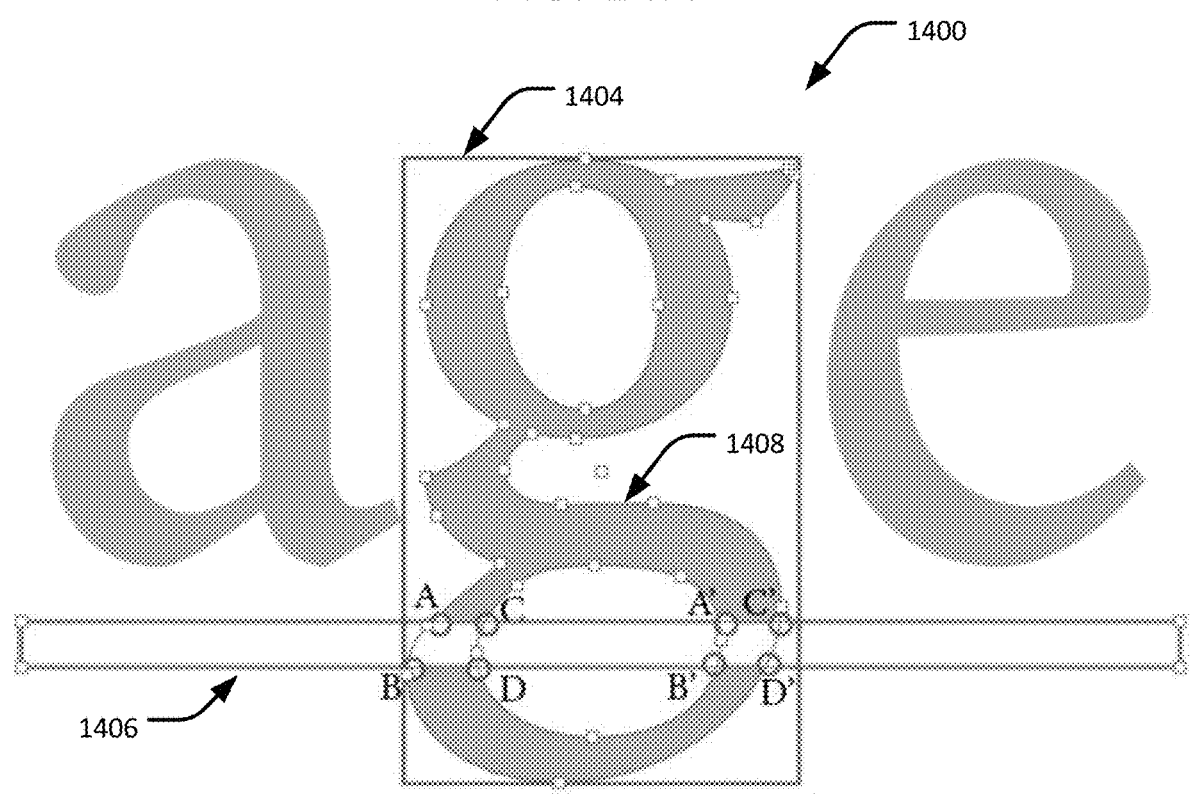

FIGS. 14A and 14B show an example of a glyph ("g") 1400 having a descender that intersects with an underline 1402 applied to the glyph. A bounding box of the glyph 1404 is compared with a bounding box 1406 of the underline. As shown in FIG. 14B, the bounding box of the glyph 1404 intersects with the bounding box of the underline 1406. Furthermore, the outline of the glyph intersects with the bounding box of the underline at points A, B, C, D, A', B', C', and D'. Therefore, the glyph descender overlaps with the underline and can be detected.

Figure 15A:
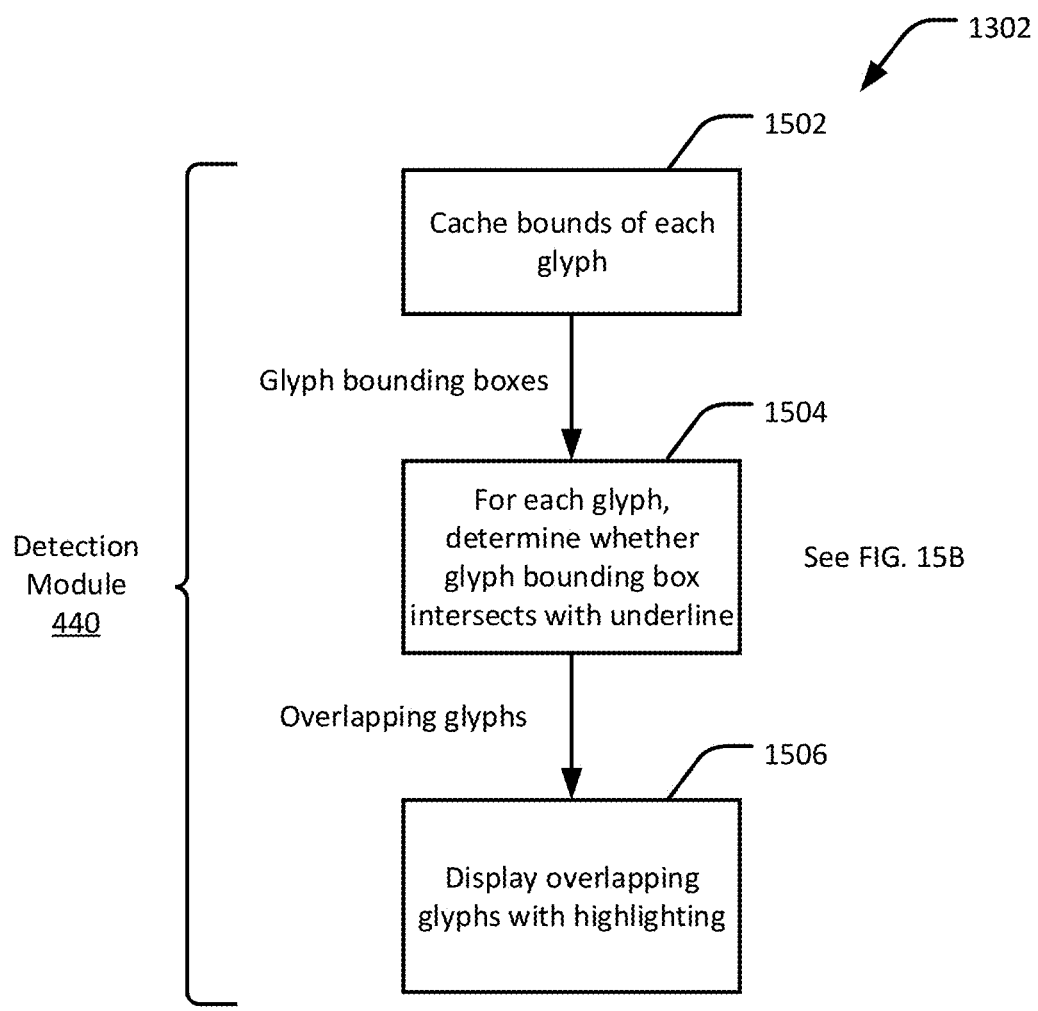
FIGS. 15A and 15B are flow diagrams for example methods of detecting glyph outlines that intersect with an underline, in accordance with certain embodiments of the present disclosure.
Figure 15B:
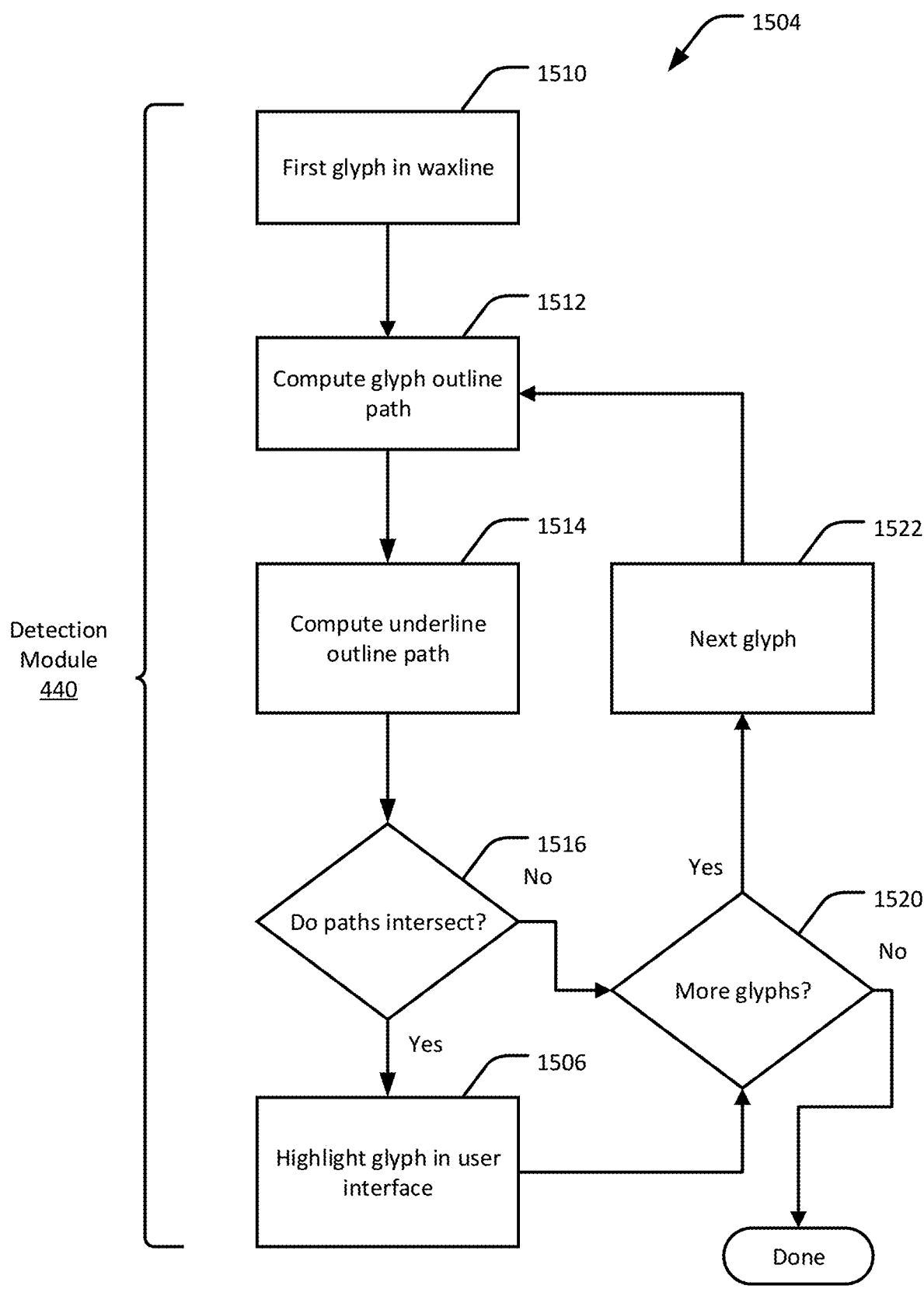

FIGS. 15A and 15B are a flow diagrams for example methods of detecting 1302 glyph outlines that intersect with an underline of the line upon which the glyph rests (FIG. 14B) and glyph outlines that intersect with an underline of an adjacent waxline (FIG. 16), in accordance with embodiments of the present disclosure. The method 1302 can be implemented using an example algorithm, described below, which uses the following data structures:

cached 1502 in a data structure, such as waxglyph_data. The data structure is populated with all glyphs of all waxlines in array, such as waxglyphs_per_waxline. An array waxglyphs_per_waxline[n] represents the waxglyph_data of 'n' waxlines where 'n' is the total number of waxlines in the document.

The method 1302 takes as an input the bounding box of each glyph, such as stored in the array waxglyphs_per_waxline[n], which is populated as described above. The method 1302 continues by determining 1504, for each glyph in the waxline, whether the bounding box for the respective glyph intersects with an underline. The method 1302 provides as an output an array representing the bounding boxes and corresponding identification of each glyph that overlaps with an underline associated with the text. The method 1302 continues by displaying 1506 (e.g., on a display device) overlapping glyphs (that is, glyphs that overlap with an underline) by visually indicating the overlapping glyphs. For example, each glyph that overlaps with an underline can be displayed with a contrasting (e.g., yellow) highlight or other indication to direct the user's attention to the glyph.

Figure 14C:
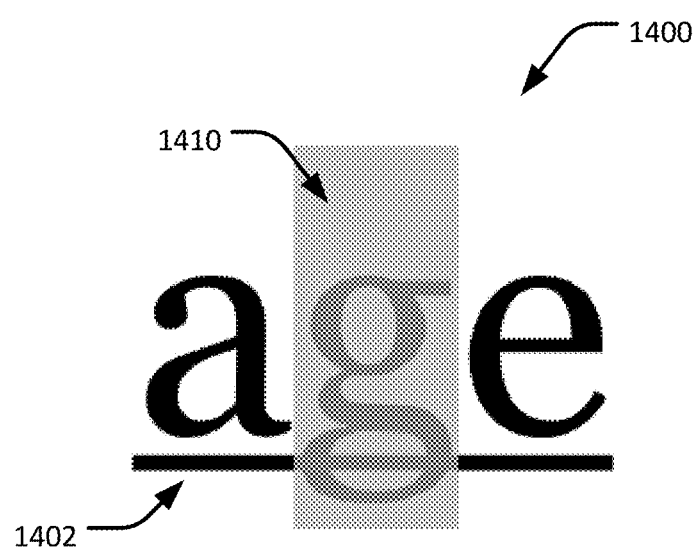
FIG. 14C shows an example of a visual indication 1410 of the glyph 1400 that intersects with the underline 1402, in accordance with certain embodiments of the present disclosure.

FIG. 14C shows an example of a visual indication 1410 of the glyph 1400 that intersects with the underline 1402. For example, the glyph that intersects with the underline is visually indicated or displayed in the user interface with a contrasting (e.g., yellow) highlight 1410 or other indication to direct the user's attention to the glyph. Note that, in some cases, the glyph is indicated or highlighted only when the glyph outline intersects with the underline outline. In some cases, for example, the glyph outline may not intersect with the underline outline even if the glyph bounding box intersects with the underline outline. In this manner, it is possible to distinctly indicate to the user whether or not the visible portion of the glyph overlaps with the underline.

FIG. 15B shows, in further detail, the determining 1504, for each glyph, whether the bounding box for the respective glyph intersects with an underline of the line of text upon

```
1. bbox - Stores bounding box information of glyph
struct bbox {
  float top;
  float bottom;
  float left;
  float right;
}
2. lbox - Stores bounding box information of the underline
struct lbox {
  float top; //represents the top edge (Ymax)
  float bottom; //represents the bottom edge (Ymin)
  float left; //represents the left edge (Xmin)
  float right; //represents the right edge (Xmax)
}
3. waxglyph_data - Stores glyph ID and bounding box of a glyph
struct waxglyph_data {
  int glyph_id;
  bbox glyph_bbox:
  bbox line_bbox;
}
4. waxglyphs_per_waxline - Stores waxglyph_data for all glyphs in the waxline
struct waxglyphs_per_waxline {
  waxglyphs[n];
};
5. overlapping_glyphs - Stores waxglyph_data for overlapping glyphs
struct overlapping_glyphs {
  waxglyph_data first_waxglyph;
  waxglyph_data_next_waxglyph;
};
```

Referring to FIG. 15A, the method 1302 begins with a pre-processing step where the bounds of each glyph in a block of text, such as stored in the waxglyph array, are which the glyph rests, in accordance with an embodiment of the present disclosure. Beginning with the first glyph in a given waxline (line of text) 1510, the method 1504 includes computing 1512 an outline path of the glyph. FIG. 14B shows an example of a glyph outline 1408 for the letter "g," which is not necessarily the same as the glyph bounding box 1404. The method 1504 further includes computing 1514 an outline path of the corresponding underline. FIG. 14B shows an example of an underline outline 1406. If the glyph outline path and the underline outline path intersect 1516, then the glyph is visually indicated 1506 in the user interface.

For example, the output array result of type overlapping_glyphs, represents glyphs that overlap with underlines as follows:

```
   result: Array of overlapping_glyphs // Glyphs that overlap with underlines
1. For i = 1 to size of waxglyphs_per_waxline array //For each glyph in a waxline
2. result = IntersectGlyphsI(waxglyphs_per waxline[i].waxglyphs) //Determine whether
      glyph intersects with underline
3. End for
4. Highlight overlapping_glyphs(result)
```

The method 1504 continues by determining 1520 whether there are more glyphs in the waxline. If so, then the next glyph is selected 1522 and the process repeats for each glyph in the waxline.

In further detail, the function IntersectGlyphs (waxglyph_data) returns an array of one or more glyphs that overlap with an underline. This function takes as an input arrays first_waxglyphs_data and next_waxglyphs_data, which represent glyphs with intersecting underlines. This function provides as an output an array result one of type overlapping_glyphs, which contains the bounding boxes and identification of glyphs that overlap with an underline.

```
Function IntersectGlyphs(waxglyph_data) Set result: Array of overlapping_glyphs
1. For j = 1 to size of waxglyphs array
   // Checking intersection of bounding boxes of glyphs
      1. If waxglyph_data[j].bbox.bottom > waxglyph_data[j].lbox.top
             1. Compute outline information of glyph corresponding to
                waxglyph_data[j] with this algorithm in paths[j]
             2. Compute outline information of the underline corresponding to
                waxglyph_data[j] with this algorithm in paths[k] respectively.
             3. If any of the paths in paths[j] intersects with those of paths[k], overlap
                is detected. Intersection is detected using Bezier clipping algorithm or
                using Sylvester matrix.
                   Insert(waxglyph_data[j]) into result_one array.
                End if
      End if
   End for
Return result_one
```

Figure 16:
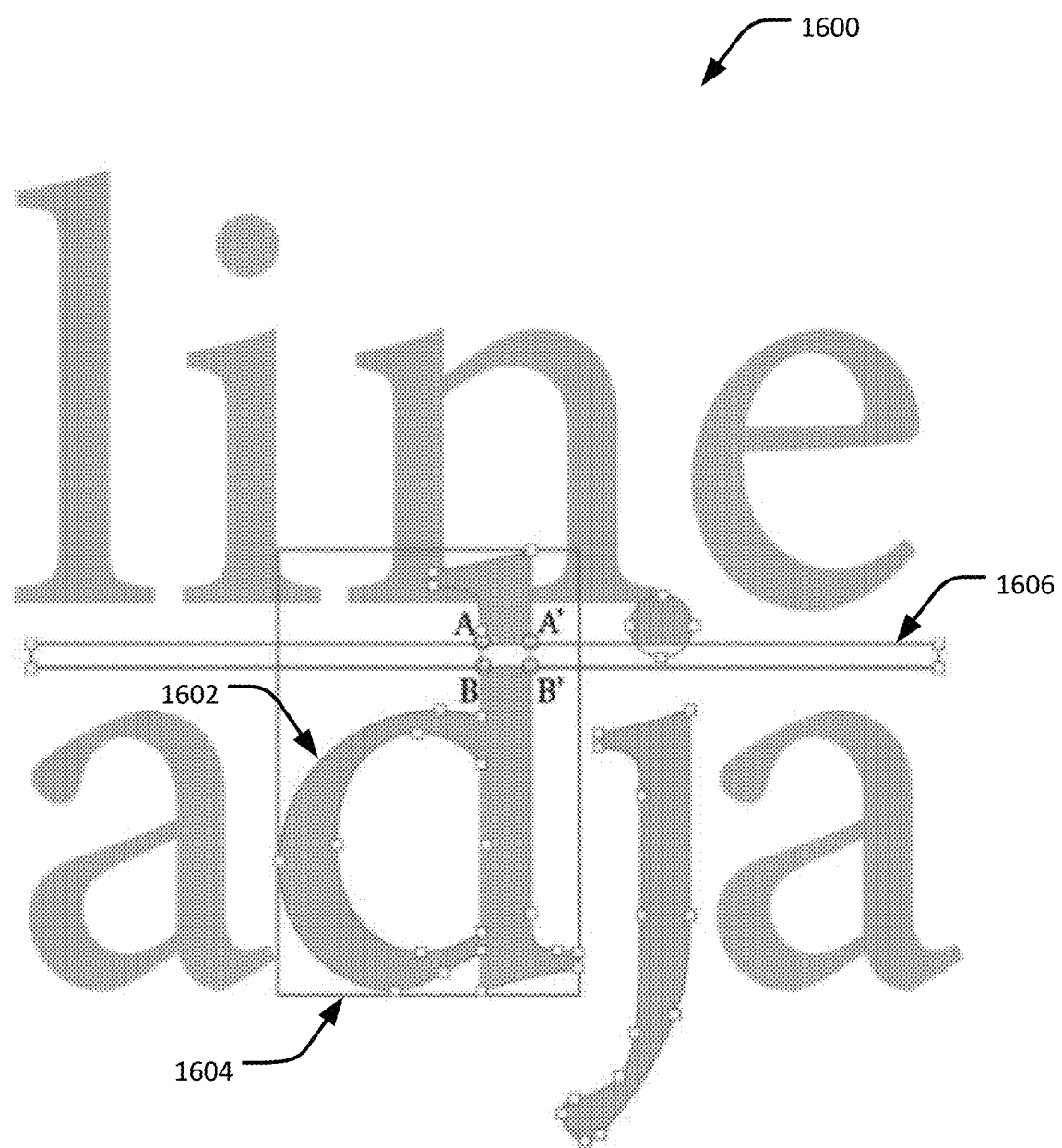
FIG. 16 shows an example of a glyph having an ascender that intersects with the underline applied to a glyph in an adjacent line, in accordance with certain embodiments of the present disclosure.

FIGS. 12B and 16 show an example of a glyph ("d") having an ascender that intersects with the underline applied to a glyph ("n") in the adjacent line above. This contrasts with the case where the glyph descender intersects with the underline applied to the same glyph, such as discussed above with respect to FIGS. 5 and 10. The bounding box of the glyph is compared with the bounding box of the adjacent underline. As shown in FIG. 16, the bounding box of the glyph intersects with the bounding box of the adjacent underline, and the outline of the glyph intersects with the bounding box of the adjacent underline at points A, B, A', and B'. Therefore, the glyph descender overlaps with the adjacent underline.

Figure 17A:
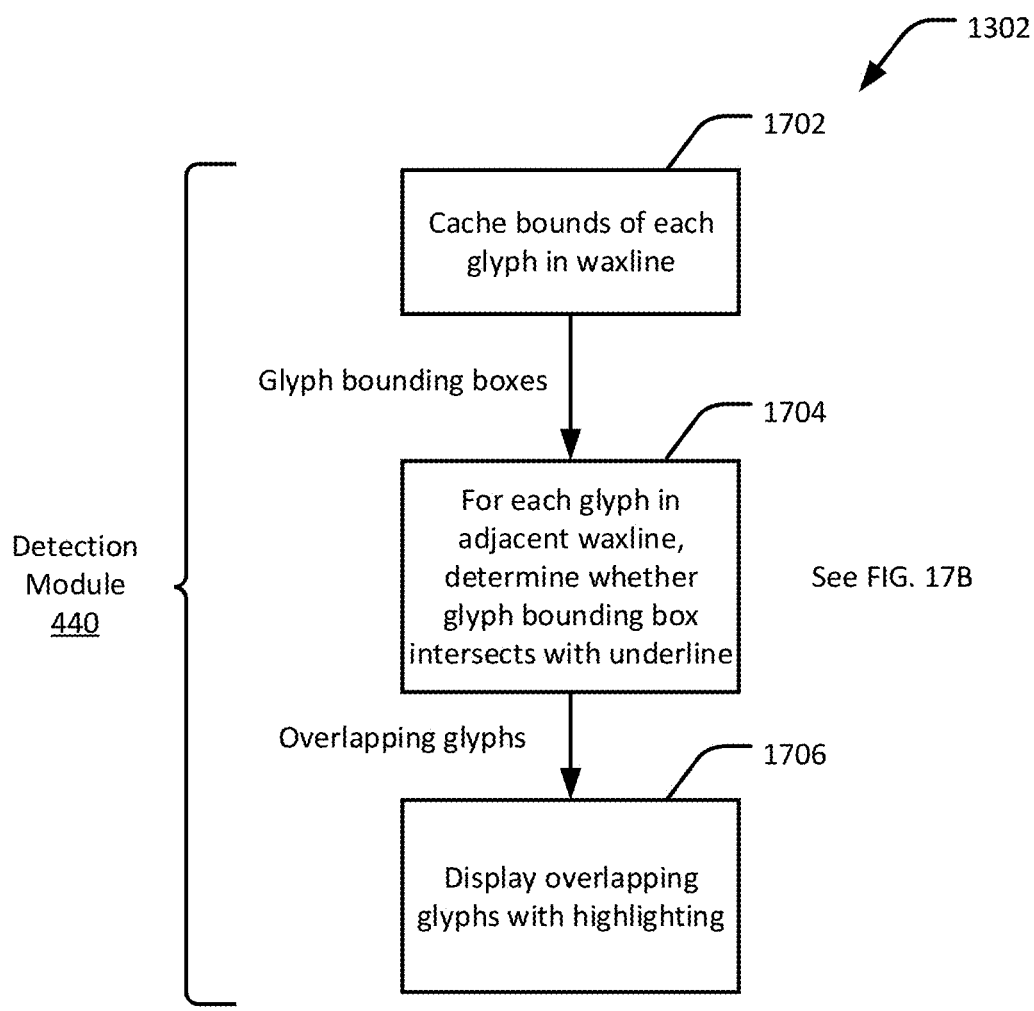
FIGS. 17A and 17B are flow diagrams for example methods of detecting glyph outlines that intersect with an adjacent underline, in accordance with certain embodiments of the present disclosure.
Figure 17B:
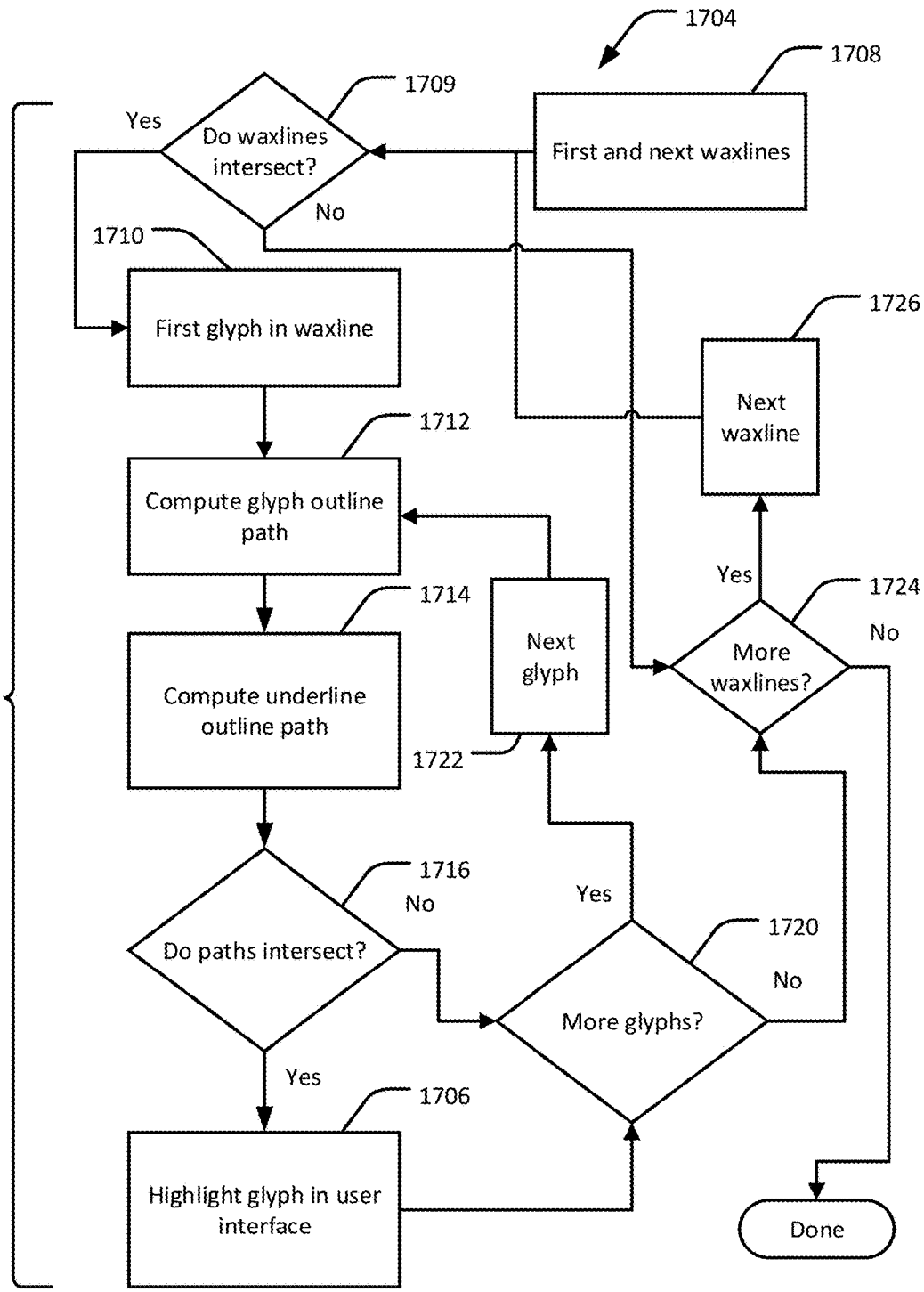

As noted above, the method of FIG. 15A can be used to detect glyph outlines that intersect with an underline of the line upon which the glyph rests. By comparison, FIGS. 17A and 17B are flow diagrams for example methods of detecting 1302 glyph outlines that intersect with an underline of an adjacent line of text (FIG. 16), in accordance with an embodiment of the present disclosure. The method 1302 can be implemented using an example algorithm, described below, which uses the following data structures:

```
1. bbox - Stores bounding box information of glyph
struct bbox {
    float top;
    float bottom;
    float left;
```

-continued

```
    float right;
}
2. lbox - Stores bounding box information of the underline
struct lbox {
    float top; //represents the top edge (Ymax)
    float bottom; //represents the bottom edge (Ymin)
    float left; //represents the left edge (Xmin)
    float right; //represents the right edge (Xmax)
}
3. waxglyph_data - Stores glyph ID and bounding box of a glyph
struct waxglyph_data {
```

-continued

```
    int glyph_id;
    bbox glyph_bbox:
    bbox line_bbox;
}
4. waxline_data - Stores top and bottom bounds of a waxline
struct waxline_data {
    float top;
    float bottom;
};
5. overlapping_glyphs - Stores waxglyph_data of overlapping glyphs
struct overlapping_glyphs {
    waxglyph_data first_waxglyph;
    waxglyph_data next_waxglyph;
};
6. List of waxglyph_data of consecutive waxlines
Array first_waxglyph_data[m];
Array next_waxglyph_data[n];
```

The method 1302 beings with a pre-processing step where the bounds of each glyph in a waxline is cached 1702 in a data structure, such as waxline_data. The data structure is populated with all glyphs of all waxlines in an array, such as waxlines_per_waxline. An array waxline_data[n] represents the bounds of 'n' waxlines where 'n' is the total number of waxlines in the document in the order in which these waxline appear in the document, and where the top and bottom variables signify the top and bottom bounds of each waxline.

The method 1302 takes as an input the bounds of each glyph, such as stored in the array waxline_data[n], which is populated as described above. The method 1302 continues by determining 1704, for each glyph, whether the bounding box for the respective glyph in the adjacent waxline intersects with an underline. The method 1302 provides as an output an array representing the bounding boxes and corresponding identification of each glyph that overlaps with an underline associated with the text.

FIG. 15B shows, in further detail, the determining 1704, for each glyph, whether the bounding box for the respective glyph in the adjacent waxline intersects with an underline, in accordance with an embodiment of the present disclosure. Beginning with the first (current) and next (adjacent) waxlines 1708, the method 1704 determines 1709 whether the first and next waxlines intersect with each other. If so, then for the first glyph in the first waxline 1710, the method 1704 includes computing 1712 an outline path of the glyph. FIG. 16 shows an example of a glyph outline 1602 for the letter "d," which is not necessarily the same as the glyph bounding box 1604. The method 1704 further includes computing 1714 an outline path of the corresponding underline. FIG. 16 shows an example of an underline outline 1606. If the glyph outline path and the underline outline path intersect 1716, then the glyph is visually indicated 1706 in the user interface with a contrasting (e.g., yellow) highlight or other indication to direct the user's attention to the glyph, such as shown in FIG. 14C. Note that, in some cases, the glyph is indicated or highlighted only when the glyph outline intersects with the underline outline. In some cases, for example, the glyph outline may not intersect with the underline outline even if the glyph bounding box intersects with the underline outline. In this manner, it is possible to distinctly indicate to the user whether the visible portion of the glyph overlaps with the underline.

For example, the output array result of type overlapping_glyphs, can be provided as follows:

--- result: Array of overlapping_glyphs
1. For i = 1 to size of waxline_data array
  2. For j = i+1 to size of waxline_data array
    // Checking intersection of waxlines
    If waxline_data[j].top < waxline_data[i].bottom //waxlines intersect
      Cache the bounding box and ID of each glyph and underline applied to
      the glyph in the intersecting waxlines in the below arrays:
        Array first_waxglyph_data[m] represents the waxglyph_data of m
          glyphs where m is the total number of glyphs in the $i^{th}$ line
        Array next_waxglyph_data[p] represents the waxglyph_data of m
          glyphs where p is the total number of glyphs in the $(i+1)^{th}$
          line.
      result = IntersectGlyphsI(first_waxglyph_data[m], next_waxglyph_data[p])
    End if
  End for
End for

---

The method 1504 continues by determining 1520 whether there are more glyphs in the current or next waxlines. If so, then the next glyph in the current or next waxline is selected 1722 and the process repeats for each glyph in the current or next waxline. Otherwise, the method 1704 includes determining 1724 whether there are any more waxlines. If so, then the next waxline is selected 1726 and the process repeats for the current and next waxlines.

The function IntersectGlyphs(waxglyph_data first_waxglyph_data[m], waxglyph_data next_waxglyph_data[p]) returns glyphs overlapping with underlines in the adjacent waxline. This function takes as an input arrays first_waxglyphs_data and next_waxglyphs_data, which represent glyphs with intersecting underlines in their respective waxlines. This function provides as an output an array result two of type overlapping_glyphs, which represents the glyph bounding boxes and identification of glyphs overlapping with underlines.

```
1. Set result: Array of overlapping_glyphs
2. For j = 1 to size of first_waxglyphs_data array
   a. For k = j+1 to size of next_waxglyphs_data array
      // Checking intersection of bounding boxes of glyphs
      2. If first_waxglyph_data[j].lbox.bottom > next_waxglyph_data[k].bbox.top
         1. Compute outline information of underline corresponding to
            waxglyph_data[j] with this algorithm in paths[j]
         2. Compute outline information of glyphs corresponding to
            waxglyph_data[j] with this algorithm in paths[k] respectively.
         3. If any of the paths in paths[j] intersects with those of paths[k], overlap
            is detected. Intersection is detected using Bezier clipping algorithm or
            using Sylvester matrix.
         4. Insert (first_waxglyph_data[j], next_waxglyph_data[k]) into result_two
            array.
         3. End if
      2. Else
         a. break
      3. End if
   b. End for
3. End for
4. Return result_two
```

The method 1702 continues by displaying 1706 (e.g., on a display device) overlapping glyphs (that is, glyphs that overlap with an underline) by visually indicating the overlapping glyphs. For example, each glyph that overlaps with an underline can be displayed with a contrasting (e.g., yellow) highlight or other indication to direct the user's attention to the glyph.

As discussed above with respect to FIG. 10A, the bounding box for a glyph can be compared to the bounding box for an underline to determine whether the glyph bounding box intersects with the underline bounding box. In accordance with some embodiments, the outline of the glyph (in contrast to the glyph bounding box) can be compared to the underline bounding box. In such cases, every glyph is uniquely identified by a glyph identifier. Using the glyph identifier, glyph outline information can be extracted from the glyph font using a glyph identifier function. This function takes as an input a glyph identifier [GID] and a font [F]. This function provides as an output a Paths array corresponding to the glyph. An example glyph identifier function is as follows:

Collect the outline information from font for given glyph identifier GID from CoolType library:

```
1. Apply transformation into the outline information
   //Transformation is applied to get the correct outline information depending on the
   current glyph position
      a. The outline information is collected in the form complex Bezier curves or paths
      b. Store the paths of each glyph in Paths Array
2. Return Paths Array
```

The outline information of a glyph can be collected in the form of Bezier paths or composite Bezier curves. FIG. 8 shows an example glyph with two closed paths represented by A-B-C-D-A and A'-B'-C'-D'-A'. The Paths array of this glyph represents these two paths.

In accordance with some embodiments, glyphs that overlap with an underline associated with the text can be highlighted for display to a user. For example, such highlighting can include applying a yellow or other contrasting color over the glyph to indicate that the glyph overlaps with the underline, such as shown in FIG. 14C. A function for highlighting glyphs that overlap with an underline takes as an input an array result of glyphs overlapping with underlines from one or more of the above algorithms (e.g., result one and/or result two) and is as follows:

```
1. For i = 1 to size of result_one array
      Highlight result_one[i].waxglyph.bbox
2. For i = 1 to size of result_two array
      Highlight result_two[i].first_waxglyph.bbox and
      result_two[i].next_waxglyph.bbox
3. End for
```

Note that in the preceding algorithm, all glyphs that intersect with an underline are highlighted whether or not the glyphs are on the same line or waxline as the intersecting underline. However, glyphs that do not intersect an underline on the same or adjacent lines are not highlighted.

Figure 18:
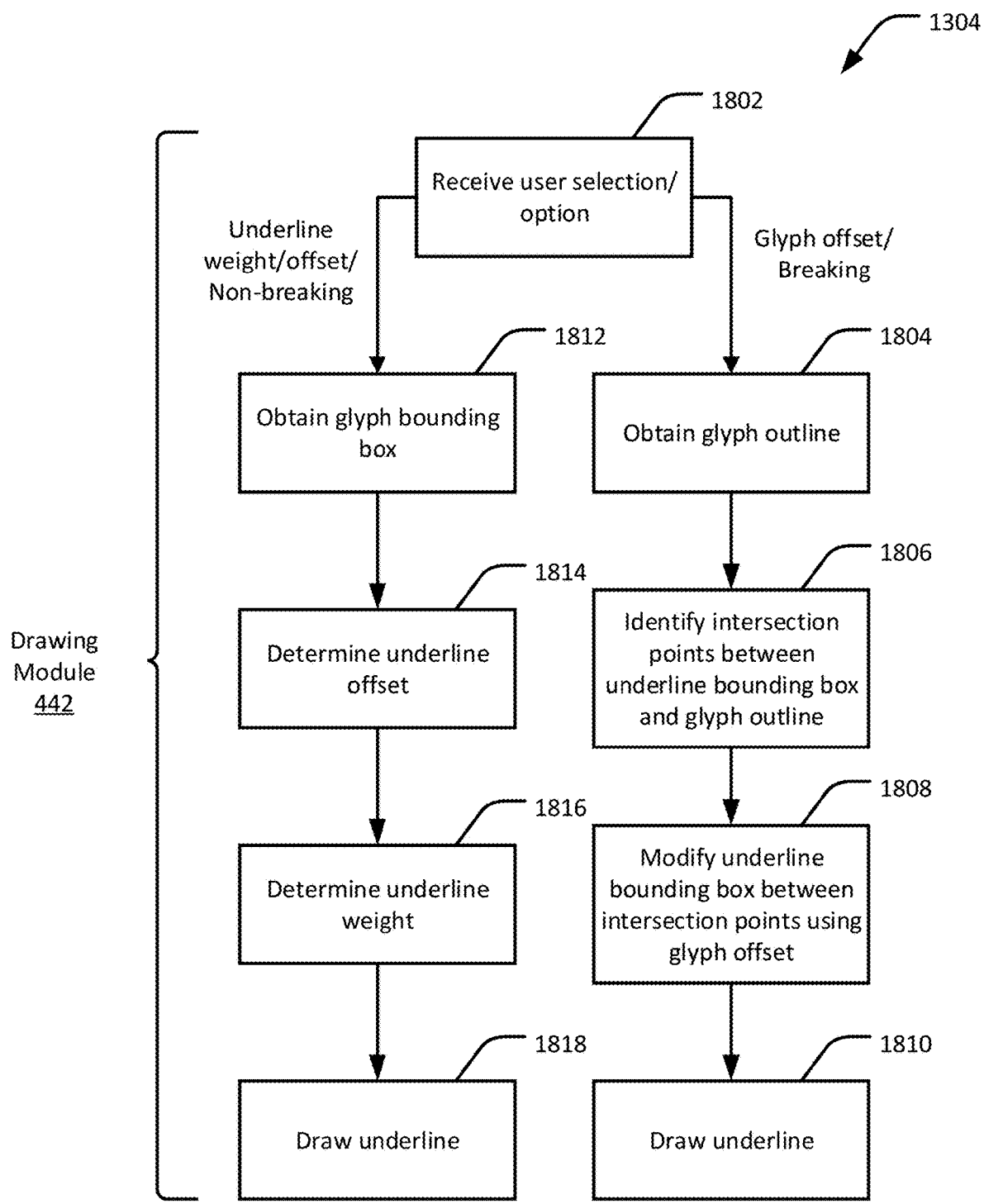
FIG. 18 is a flow diagram of a method for drawing a non-intersecting underline of text in digital typography, in accordance with certain embodiments of the present disclosure.

FIG. 18 is a flow diagram of a method 1304 for drawing a non-intersecting underline of text in digital typography, in accordance with an embodiment of the present disclosure. The underline is drawn using either one of two techniques based on a user selection 1802. The user selection 1802 includes drawing a modified underline using a user-specified glyph offset parameter or using a user-specified underline weight parameter and user-specified underline offset parameter. With either selection, the algorithm is configured draw a modified underline such that the modified underline avoids intersecting with any glyph depending on the user selection 1802. In one example, the user specifies a glyph offset parameter, which is a distance (whitespace) around the glyph where no underline is drawn, also referred to as a breaking underline because the modified underline breaks around the glyph that it would otherwise overlap with. In another example, the user specifies an underline weight parameter and an underline offset parameter, which define the height and position, respectively, of the underline relative to the baseline of the text, also referred to as a non-breaking underline because the modified underline avoids overlapping with all glyphs in the text that it would otherwise overlap with.

In some embodiments, the user selection 1802 includes a selection of a highlighted glyph via the user interface, such as described with respect to FIGS. 15A-B and 17A-B. For example, if the user selects a highlighted glyph, the user interface presents a dialog in which the user can specify whether an underline is drawn using a user-specified glyph offset parameter (a breaking underline) or using a user-specified underline weight parameter and underline offset parameter (a non-breaking underline). In some cases, default values can be assigned to the glyph offset parameter, the underline weight parameter, and/or the underline offset parameter. The user can use the default values or change them as desired. Each of these parameters can, for example, include a value representing pixels, coordinates, distance, or any other unit of position or measure.

For each of these techniques, a different underline drawing algorithm can be used. For example, some algorithms are configured to draw an underline that avoids intersecting with the glyphs using the glyph offset parameter. Referring to FIG. 18, when the glyph offset parameter is used, the underline is drawn such that there is a buffer or whitespace separating the underline from the glyph. This offset can, in some instances, mirror the shape and curvature of the glyph. In some embodiments, a graphics port can be used to draw the underlines below characters. The graphics port is an abstraction of different types of ports where the content can be drawn. For example, the graphics port can include a display/screen port, a PDF port, a printer port, or other device port for outputting, displaying, or printing text and graphics. To draw an underline below a glyph (that is, an underline on the same line as the glyph), the following four parameters are supplied to the graphics port:

1. The line width expressed using bbox.xMax and bbox.xMin.
2. The line width expressed using Underline_Offset and Underline_Weight.

These parameters are combined to form the underline bounding box, such as shown in FIG. 14B (reference number 1406). The method 1304 includes obtaining 1804 a glyph outline and identifying 1806 the intersections between the underline bounding box and the glyph outline. The method 1304 further includes modifying 1808 the underline bounding box based on the intersections and the user-specified glyph offset parameter. The method 1304 further includes drawing 1810 the underline by passing the modified underline bounding box to the graphics port.

In further detail, after identifying 1806 the points of intersection between the underline bounding box and the glyph outline, the bounding points of the underline can be modified 1808 as follows, for instance by offsetting the underline from the glyph outline.

A function draw_smart_underline(overlapping_glyphs result_one, offset glyph) for drawing a modified underline takes as an input an array result representing glyphs that overlap with unmodified underlines, and a user-defined glyph offset value. The glyph offset value determines the minimum distance between the modified underline and the glyph outline. This function provides as an output an underline outline that avoids intersecting or overlapping with the glyph outline. The path of the underline bounding box is modified to be offset from the glyph outline, thus providing a buffer or whitespace between the underline and the glyph where they would otherwise overlap.

Figure 14D:
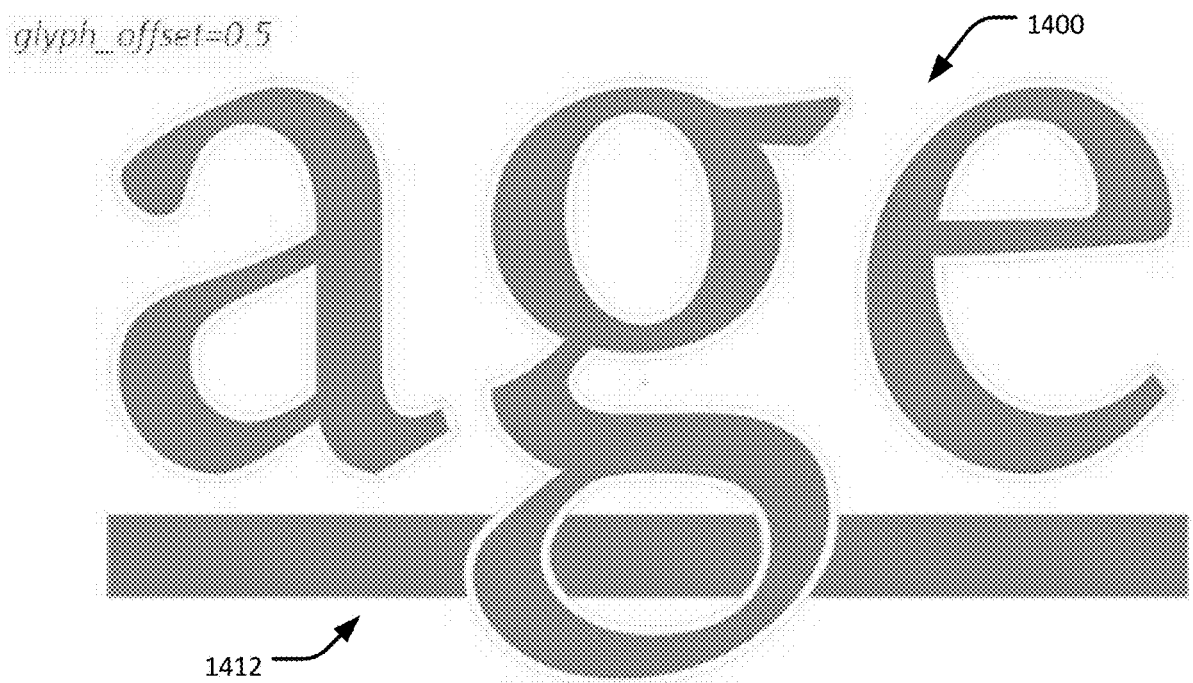
FIGS. 14D and 14E show example results with a modified underline using a user-defined glyph offset value, in accordance with certain embodiments of the present disclosure.
Figure 14E:

FIGS. 14D and 14E show example results of drawing a modified underline using the user-defined glyph offset value, in accordance with certain embodiments of the present disclosure. In FIG. 14D, a modified underline 1412 is drawn with a glyph offset value of 0.5. In FIG. 14E, a modified underline 1414 is drawn with a glyph offset value of 2.0. As can be seen, the distance specified by the glyph offset value defines the amount of white space between the glyph and the underline at the point of intersection such that the underline avoids intersecting with or overlapping the glyph (as compared to FIG. 14A where the underline overlaps the glyph). For example, increasing the glyph offset value increases the amount of white space between the glyph and the modified underline. The glyph offset value can be assigned a default value or it can be changed by the user.

The following algorithm can be used to draw a modified underline below a glyph whose outline intersects with the underline:

```
1. For i = 1 to size of result_one array
    a. waxglyph_data glyph = result_one[i]
      // Get the point of intersection between the glyph outline and the underline
      // This information is computed using the Bezier clipping algorithm
      // Store this information in points[k] array
      Path_x = glyph.bbox.xMin to points[0] // Path from glyph
        bounding box to first intersection
      + glyph_offset
      + points[1] – glyph_offset to points[2] // Path to next intersection
      with offset
      // Repeat for each intersection
      + glyph_offset +...+ points[k]
      + glyph_offset to glyph.bbox.xMax // Path from last intersection to
      glyph bounding box
      Path_y = underline_offset + glyph_offset to underline_offset +
      glyph_offset + underline_weight
    Combine Path_x and Path_y to form to the underline bounding box of the glyph:
    glyph.line_bbox
2. End for
```

For example, referring to FIG. 14B, the path of a portion of the modified underline adjacent to the glyph provided by the above algorithm runs from the glyph bounding box 1404 to intersection A plus/minus the glyph offset distance, then to intersection B plus/minus the glyph offset distance, then to the glyph bounding box 1404. Similarly, the path of another portion of the modified underline adjacent to the glyph runs from intersection C plus/minus the glyph offset distance to intersection A' plus/minus the glyph offset distance, then to intersection B' plus/minus the glyph offset distance, then to intersection D plus/minus the glyph offset distance, then to intersection C plus/minus the glyph offset distance. Similarly, the path of yet another portion of the modified underline adjacent to the glyph runs from the glyph bounding box 1404 to intersection C' plus/minus the glyph offset distance, then to intersection D' plus/minus the glyph offset distance, then to the glyph bounding box 1404.

The following algorithm can be used to draw an underline below a glyph whose underline intersects with the glyph outlines in an adjacent line of text, such as shown in FIG. 16 (the underline of "line" intersects with the glyph "d" in the adjacent line of text):

```
1. For i = 1 to size of result_two / 2 array
   a. waxglyph_data glyph_above = result_one[i]
   b. waxglyph_data glyph_below = result_one[i+1]
      Get the point of intersection between the underline of glyph above and the
      glyph outline of glyph_below. This information is already computed using
      the Bezier clipping algorithm
      Store this information in points[k] array
         Path_x = glyph_above.bbox.xMinXopoints[0] +
         glyph_offset+points[1] – glyph_offset to points [2] + glyph_offset
         +...+ points[k] + glyph_offset to glyph_above.bbox.xMax
         Path_y = underline_offset + glyph_offset to underline_offset +
         glyph_offset + underline_weight
      Combine Path_x and Path_y to form to the underline bounding box of the
      glyph_above: glyph_above.line_bbox
2. End for
3. Graphics port is populated with the combined path
4. User selected color attributes are set on the graphics port
5. Graphics port is requested to fill the path using the colors
```

FIG. 19 shows several examples of non-breaking and breaking underlines drawn such that the breaking underlines avoid intersecting or overlapping with any glyph, in accordance with an embodiment of the present disclosure. As can be seen in these examples, the non-breaking underlines intersect with or overlap one or more glyphs, while the breaking underlines do not intersect with or overlap the glyphs. FIG. 20 shows an example of a breaking double underline drawn such that the double underline avoids intersecting or overlapping with any glyph, in accordance with certain embodiments of the present disclosure.

In another example, some algorithms are configured to draw a continuous underline that avoids intersecting with the glyph outlines. FIG. 21 shows an example of a continuous (non-breaking) underline drawn such that the underline avoids intersecting or overlapping with any glyph, in accordance with an embodiment of the present disclosure. When the underline weight parameter and the underline offset parameter are used, a continuous (non-breaking) underline is drawn such that the underline avoids intersecting or overlapping with any glyph, such as shown in FIG. 21. To find a suitable distance at which the underline must be drawn below a glyph such that the underline avoids intersecting or overlapping with any glyph outlines, an underline of a given weight is drawn between two adjacent lines of text without intersecting with the bounding boxes of any glyphs in either line.

Referring again to FIG. 18, the method 1304 includes obtaining 1812 as an input an array representing glyphs (for example, a glyph ID) and glyph bounding boxes, such as waxline_data[n], which has been populated in the pre-processing stage. Further inputs include a user-specified weight (underline_weight) of the underline and a user-specified offset of the underline (underline_offset). The method 1304 further includes determining 1814 an optimum underline offset based on the user-specified offset and determining 1816 an optimum underline weight based on the user-specified weight. The method 1304 further includes drawing 1818 the underline based on the optimum weight and offset below the glyphs which does not intersect or overlap with any glyph outline, such as shown in FIG. 21. An example algorithm is as follows:

```
1. For i = 1 to size of waxline_data array
   a. For j = i+1 to size of waxline_data array
// Checking intersection of waxlines
      If waxline_data[i].bottom < waxline_data[j].top //waxlines do not
      intersect
      //finding optimum offset of underline
      range[i] = max(waxline[j].bbox.top) –
         max(waxline[i].bbox. bottom)
      M= max(waxline[i].bbox.bottom) – waxline[i].y
      offset = M to M + range [i]
         //finding optimum weight of underline
         If offset > underline_weight
            For k = underline_weight to MAX_FLOAT
               Find k such that k + offset +
               waxline_data[i].bottom <
               waxline_data[j].top
               Set weight[i] = k
         If offset < underline_weight
            For k = underline_weight to 0
               Find k such that k + offset +
               waxline_data[i].bottom <
```

```
            waxline_data[j].top
            Set weight[i] = k
        // waxline intersect
        Else return no result
2. Set optimum_offset = minimum in offset array
3. Set optimum_weight = minimum in weight array which is greater than or equal to user
provided underline_weight
4. Draw an underline below the text using the above parameters of offset and weight
```

Numerous embodiments will be apparent in light of the present disclosure, and features described herein can be combined in any number of configurations. One example embodiment provides a computer-implemented method of computer-implemented method for marking text in digital typography. The method includes identifying, by at least one processor, one or more glyphs in the text that intersect with a text marking associated with the text; causing, by the at least one processor, a display device to visually indicate, in a user interface, the one or more glyphs that intersect with the text marking; receiving, by the at least one processor, a user selection of the one or more glyphs that intersect with the text marking in the user interface; drawing, by the at least one processor, a modified text marking to avoid intersecting with the one or more glyphs in the user selection; and causing, by the at least one processor, a display device to display the modified text marking with the text. In some cases, the user selection includes the user-specified glyph offset parameter, and the drawing includes obtaining, by the at least one processor, a glyph outline of the one or more glyphs; identifying, by the at least one processor, intersections between a text marking bounding box and the glyph outline, the text marking bounding box being associated with the text marking; modifying, by the at least one processor, the text marking bounding box based on the intersections and a user-specified glyph offset parameter; and passing, by the at least one processor, the modified text marking bounding box to a graphics port for displaying the modified text marking on the display device. In some cases, the user selection includes a user-specified text marking weight parameter and a user-specified text marking offset parameter, and the drawing includes obtaining, by the at least one processor, a glyph bounding box corresponding to the one or more glyphs; determining, by the at least one processor, a text marking offset based on the user-specified text marking offset parameter and the glyph bounding box; and determining, by the at least one processor, a text marking weight based on the user-specified text marking weight parameter and the glyph bounding box, where the modified text marking is drawn based on the text marking weight and the text marking offset. In some cases, the text marking is associated with a line of text including the one or more glyphs, and the identifying includes caching, by the at least one processor in a storage, a glyph bounding box surrounding each of the one or more glyphs; determining, by the at least one processor and for each of the one or more glyphs, whether the respective cached glyph bounding box intersects with the text marking; and causing, by the at least one processor, the display device to visually indicate the glyph corresponding to the glyph bounding box intersecting with the text marking. In some such cases, the glyph bounding box includes a box that encloses the one or more glyphs. In some such cases, the text marking is adjacent to a waxline of text including the one or more glyphs, and the identifying includes caching, by the at least one processor in a storage, a glyph bounding box surrounding each of the one or more glyphs in the waxline; determining, by the at least one processor and for each of the one or more glyphs, whether the respective cached glyph bounding box intersects with the text marking; and causing, by the at least one processor, the display device to visually indicate the glyph corresponding to the glyph bounding box intersecting with the text marking. In some other such cases, the waxline defines a position of the text in a document, the number of characters in the waxline, and line break data.

Another example embodiment provides a non-transitory computer readable medium having instructions encoded thereon that when executed by at least one processor of a computing device cause the at least one processor to perform a process of underlining text in digital typography. The process includes identifying one or more glyphs in the text that intersect with an underline associated with the text; receiving a user selection including one or more glyphs that intersect with the underline; drawing a modified underline to avoid intersecting with the one or more glyphs in the user selection; and causing a display device to display the modified underline with the text. In some cases, the user selection includes a user-specified glyph offset parameter, and the drawing includes obtaining a glyph outline of the one or more glyphs; identifying intersections between an underline bounding box and the glyph outline, the underline bounding box being associated with the underline; modifying the underline bounding box based on the intersections and the user-specified glyph offset parameter; and passing the modified underline bounding box to a graphics port for displaying the modified underline on the display device. In some cases, the user selection includes a user-specified underline weight parameter and a user-specified underline offset parameter, and the drawing includes obtaining a glyph bounding box corresponding to the one or more glyphs; determining an underline offset based on the user-specified underline offset parameter and the glyph bounding box; and determining an underline weight based on the user-specified underline weight parameter and the glyph bounding box, where the drawing is based on the underline weight and the underline offset. In some cases, the underline is associated with a line of text including the one or more glyphs, and the identifying includes caching, in a storage, a glyph bounding box surrounding each of the one or more glyphs; determining, for each of the one or more glyphs, whether the respective cached glyph bounding box intersects with the underline; and causing the display device to visually indicate the glyph corresponding to the glyph bounding box intersecting with the underline. In some such cases, the glyph bounding box includes a box that encloses the one or more glyphs. In some cases, the underline is adjacent to a waxline of text including the one or more glyphs, and the identifying includes caching, in a storage, a glyph bounding box surrounding each of the one or more glyphs in the waxline; determining, for each of the one or more glyphs, whether the respective cached glyph bounding box intersects with the underline; and causing the display device to visually indicate the glyph corresponding to the glyph bounding box intersecting with the underline. In some such cases, the waxline defines a position of the text in a document, the number of characters in the waxline, and line break data.

Another example embodiment provides a system for underlining text in digital typography. The system includes a storage and at least one processor operatively coupled to the storage, the at least one processor configured to execute instructions stored in the storage that when executed cause the processor to carry out a process. The process includes identifying one or more glyphs in the text that intersect with an underline associated with the text; drawing a modified underline to avoid intersecting with the one or more glyphs; and causing a display device to display the modified underline with the text. In some cases, the drawing includes obtaining a glyph outline of the one or more glyphs; identifying intersections between an underline bounding box and the glyph outline, the underline bounding box being associated with the underline; modifying the underline bounding box based on the intersections and a user-specified glyph offset parameter; and passing the modified underline bounding box to a graphics port for displaying the modified underline on the display device. In some cases, the drawing includes obtaining a glyph bounding box corresponding to the one or more glyphs; determining an underline offset based on a user-specified underline offset parameter and the glyph bounding box; and determining an underline weight based on a user-specified underline weight parameter and the glyph bounding box, where the drawing is based on the underline weight and the underline offset. In some cases, the underline is associated with a line of text including the one or more glyphs, and the identifying includes caching, in the storage, a glyph bounding box surrounding each of the one or more glyphs; determining, for each of the one or more glyphs, whether the respective cached glyph bounding box intersects with the underline; and causing the display device to visually indicate the glyph corresponding to the glyph bounding box intersecting with the underline. In some such cases, the glyph bounding box includes a box that encloses the one or more glyphs. In some cases, the underline is adjacent to a waxline of text including the one or more glyphs, and the identifying includes caching, in the storage, a glyph bounding box surrounding each of the one or more glyphs in the waxline; determining, by the at least one processor and for each of the one or more glyphs, whether the respective cached glyph bounding box intersects with the underline; and causing, by the at least one processor, the display device to visually indicate the glyph corresponding to the glyph bounding box intersecting with the underline.

The foregoing description and drawings of various embodiments are presented by way of example only. These examples are not intended to be exhaustive or to limit the invention to the precise forms disclosed. Alterations, modifications, and variations will be apparent in light of this disclosure and are intended to be within the scope of the invention as set forth in the claims.

What is claimed is:

1. A method for text marking in digital typography, the method comprising:
   identifying, by at least one processor, one or more glyphs in a text that intersects with a text marking associated with the text, the text marking including at least one of an underline, an overline, and a strikethrough;
   receiving, by the at least one processor and via a user interface, a user selection of the one or more glyphs that intersect with the text marking;
   drawing, by the at least one processor, a modified text marking as one or more closed paths separated from the one or more glyphs in the user selection by a buffer or whitespace, the modified text marking including at least one of a modified underline, a modified overline, or a modified strikethrough; and
   causing, by the at least one processor, an output device to display or print the modified text marking with the text.

2. The method of claim 1, wherein the drawing includes obtaining, by the at least one processor, a glyph outline of the one or more glyphs;
   identifying, by the at least one processor, intersections between a text marking bounding box and the glyph outline, the text marking bounding box being associated with the text marking;
   modifying, by the at least one processor, the text marking bounding box based on the intersections and a glyph offset parameter; and
   passing, by the at least one processor, the modified text marking bounding box to a graphics port for displaying the modified text marking on the output device.

3. The method of claim 1, wherein the drawing includes obtaining, by the at least one processor, a glyph bounding box corresponding to the one or more glyphs;
   determining, by the at least one processor, a text marking offset based on a text marking offset parameter and the glyph bounding box; and
   determining, by the at least one processor, a text marking weight based on a text marking weight parameter and the glyph bounding box,
   wherein the modified text marking is drawn based on the text marking weight and the text marking offset.

4. The method of claim 1, wherein the text marking is associated with a line of text including the one or more glyphs, and wherein the identifying includes
   caching, by the at least one processor in a storage, a glyph bounding box surrounding each of the one or more glyphs;
   determining, by the at least one processor and for each of the one or more glyphs, whether the respective cached glyph bounding box intersects with the text marking; and
   causing, by the at least one processor, the output device to visually indicate the glyph corresponding to the glyph bounding box intersecting with the text marking.

5. The method of claim 4, wherein the glyph bounding box includes a box that encloses the one or more glyphs.

6. The method of claim 1, wherein the modified text marking is adjacent to a waxline of text including the one or more glyphs, and wherein the identifying includes
   caching, by the at least one processor in a storage, a glyph bounding box surrounding each of the one or more glyphs in the waxline;
   determining, by the at least one processor and for each of the one or more glyphs, whether the respective cached glyph bounding box intersects with the text marking; and
   causing, by the at least one processor, the output device to visually indicate the glyph corresponding to the glyph bounding box intersecting with the text marking.

7. The method of claim 6, wherein the waxline defines a position of the text in a document, the number of characters in the waxline, and line break data.

8. A non-transitory computer readable medium having instructions stored thereon that when executed by a processing device cause the processing device to perform operations comprising:

identifying one or more glyphs in a text that intersect with a text marking associated with the text, the text marking including at least one of a breaking line, a non-breaking line, and a horizontal line;

receiving, by the at least one processor and via a user interface, a user selection of the one or more glyphs that intersect with the text marking;

drawing a modified text marking as one or more curves separated from the one or more glyphs in the user selection by a buffer or whitespace, the modified text marking including at least one of a modified breaking line, a modified non-breaking line, or a modified horizontal line; and causing an output device to display or print the modified text marking with the text.

9. The non-transitory computer readable medium of claim 8, wherein the drawing includes obtaining a glyph outline of the one or more glyphs;

identifying intersections between a text marking bounding box and the glyph outline, the text marking bounding box being associated with the text marking;

modifying the text marking bounding box based on the intersections and a glyph offset parameter; and passing the modified text marking bounding box to a graphics port for displaying the modified text marking on the output device.

10. The non-transitory computer readable medium of claim 8, wherein the drawing includes obtaining a glyph bounding box corresponding to the one or more glyphs;

determining an a text marking offset based on a text marking offset parameter and the glyph bounding box; and determining a text marking weight based on a text marking weight parameter and the glyph bounding box, wherein the modified text marking is drawn based on the text marking weight and the text marking offset.

11. The non-transitory computer readable medium of claim 8, wherein the text marking is associated with a line of text including the one or more glyphs, and wherein the identifying includes caching, in a storage, a glyph bounding box surrounding each of the one or more glyphs;

determining, for each of the one or more glyphs, whether the respective cached glyph bounding box intersects with the underlinctext marking; and causing the output device to visually indicate the glyph corresponding to the glyph bounding box intersecting with the underlinctext marking.

12. The non-transitory computer readable medium of claim 11, wherein the glyph bounding box includes a box that encloses the one or more glyphs.

13. The non-transitory computer readable medium of claim 8, wherein the text marking is adjacent to a waxline of text including the one or more glyphs, and wherein the identifying includes caching, in a storage, a glyph bounding box surrounding each of the one or more glyphs in the waxline;

determining, for each of the one or more glyphs, whether the respective cached glyph bounding box intersects with the text marking; and causing the output device to visually indicate the glyph corresponding to the glyph bounding box intersecting with the text marking.

14. The non-transitory computer readable medium of claim 13, wherein the waxline defines a position of the text in a document, the number of characters in the waxline, and line break data.

15. A system for underlining text in digital typography, the system comprising:

a storage; and at least one processor operatively coupled to the storage, the at least one processor configured to execute instructions stored in the storage that when executed cause the processor to carry out a process including identifying one or more glyphs in a text that intersect with a text marking associated with the text, the text marking including at least one of an underline, an overline, and a strikethrough;

drawing a modified text marking as one or more closed paths separated from the one or more glyphs in the user selection by a buffer or whitespace, the modified text marking including at least one of a modified underline, a modified overline, or a modified strikethrough; and causing an output device to display the modified text marking with the text.

16. The system of claim 15, wherein the drawing includes obtaining a glyph outline of the one or more glyphs;

identifying intersections between a text marking bounding box and the glyph outline, the text marking bounding box being associated with the text marking;

modifying the text marking bounding box based on the intersections and a glyph offset parameter; and passing the modified text marking bounding box to a graphics port for displaying the modified text marking on the output device.

17. The system of claim 15, wherein the drawing includes obtaining a glyph bounding box corresponding to the one or more glyphs;

determining a text marking offset based on a text marking offset parameter and the glyph bounding box; and determining a text marking weight based on an a text marking weight parameter and the glyph bounding box, wherein the modified underline text marking is drawn based on the underline text marking weight and the 2text marking offset.

18. The system of claim 15, wherein the text marking is associated with a line of text including the one or more glyphs, and wherein the identifying includes caching, in the storage, a glyph bounding box surrounding each of the one or more glyphs;

determining, for each of the one or more glyphs, whether the respective cached glyph bounding box intersects with the text marking; and causing the output device to visually indicate the glyph corresponding to the glyph bounding box intersecting with the text marking.

19. The system of claim 18, wherein the glyph bounding box includes a box that encloses the one or more glyphs.

20. The system of claim 15, wherein the text marking is adjacent to a waxline of text including the one or more glyphs, and wherein the identifying includes caching, in the storage, a glyph bounding box surrounding each of the one or more glyphs in the waxline;

determining, by the at least one processor and for each of the one or more glyphs, whether the respective cached glyph bounding box intersects with the text marking; and causing, by the at least one processor, the output device to visually indicate the glyph corresponding to the glyph bounding box intersecting with the text marking.

* * * * *

UNITED STATES PATENT AND TRADEMARK OFFICE
CERTIFICATE OF CORRECTION

PATENT NO.         : 11,886,795 B2
APPLICATION NO.    : 17/653735
DATED              : January 30, 2024
INVENTOR(S)        : Aman Arora and Rohit Kumar Dubey Page 1 of 1

It is certified that error appears in the above-identified patent and that said Letters Patent is hereby corrected as shown below:

In the Claims

Column 26 - Claim 17:
Line 43 replace "the modified underline text marking" with --the modified text marking--
Line 44 replace "the underline text marking weight" with --the text marking weight--
Line 45 replace "2text" with --text--

Signed and Sealed this
Fifth Day of March, 2024

Katherine Kelly Vidal
*Director of the United States Patent and Trademark Office*